(12) United States Patent
Suzuno et al.

(10) Patent No.: US 7,609,258 B2
(45) Date of Patent: Oct. 27, 2009

(54) INFORMATION PROCESSING APPARATUS, INFORMATION PROCESSING METHOD, AND PROGRAM

(75) Inventors: Satoshi Suzuno, Kanagawa (JP); Shizue Okuda, Kanagawa (JP); Natsuo Koda, Kanagawa (JP); Junpei Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 11/580,867

(22) Filed: Oct. 16, 2006

(65) Prior Publication Data

US 2007/0103480 A1 May 10, 2007

(30) Foreign Application Priority Data

Nov. 8, 2005 (JP) ............................. P2005-323134

(51) Int. Cl.
*G06T 15/00* (2006.01)
(52) U.S. Cl. ................... 345/419; 345/423; 345/427; 345/428; 345/440; 345/582; 345/645
(58) Field of Classification Search .................. 345/419, 345/423, 427, 428, 440, 582, 645
See application file for complete search history.

(56) References Cited

U.S. PATENT DOCUMENTS

2006/0253245 A1 * 11/2006 Cera et al. ................... 701/117

FOREIGN PATENT DOCUMENTS

JP 2005-56075 3/2005

* cited by examiner

*Primary Examiner*—Kimbinh T Nguyen
(74) *Attorney, Agent, or Firm*—Rader, Fishman & Grauer PLLC

(57) ABSTRACT

An information processing apparatus generating a three-dimensional map on the basis of three-dimensional map data includes rendering area acquiring means for acquiring a rendering area in which the three-dimensional map is generated with respect to a focal point; identifying means for identifying the three-dimensional map data in the rendering area, among the three-dimensional map data including rendering object data that concerns at least one rendering object and that is hierarchized into multiple groups in accordance with characteristics of the rendering object; rendering object data acquiring means for selecting a group on the basis of the distance from the focal point and acquiring the rendering object data in the selected group from the three-dimensional map data in the rendering area; and three-dimensional map generating means for rendering the rendering object on the basis of the rendering object data to generate the three-dimensional map.

12 Claims, 19 Drawing Sheets

FIG. 6
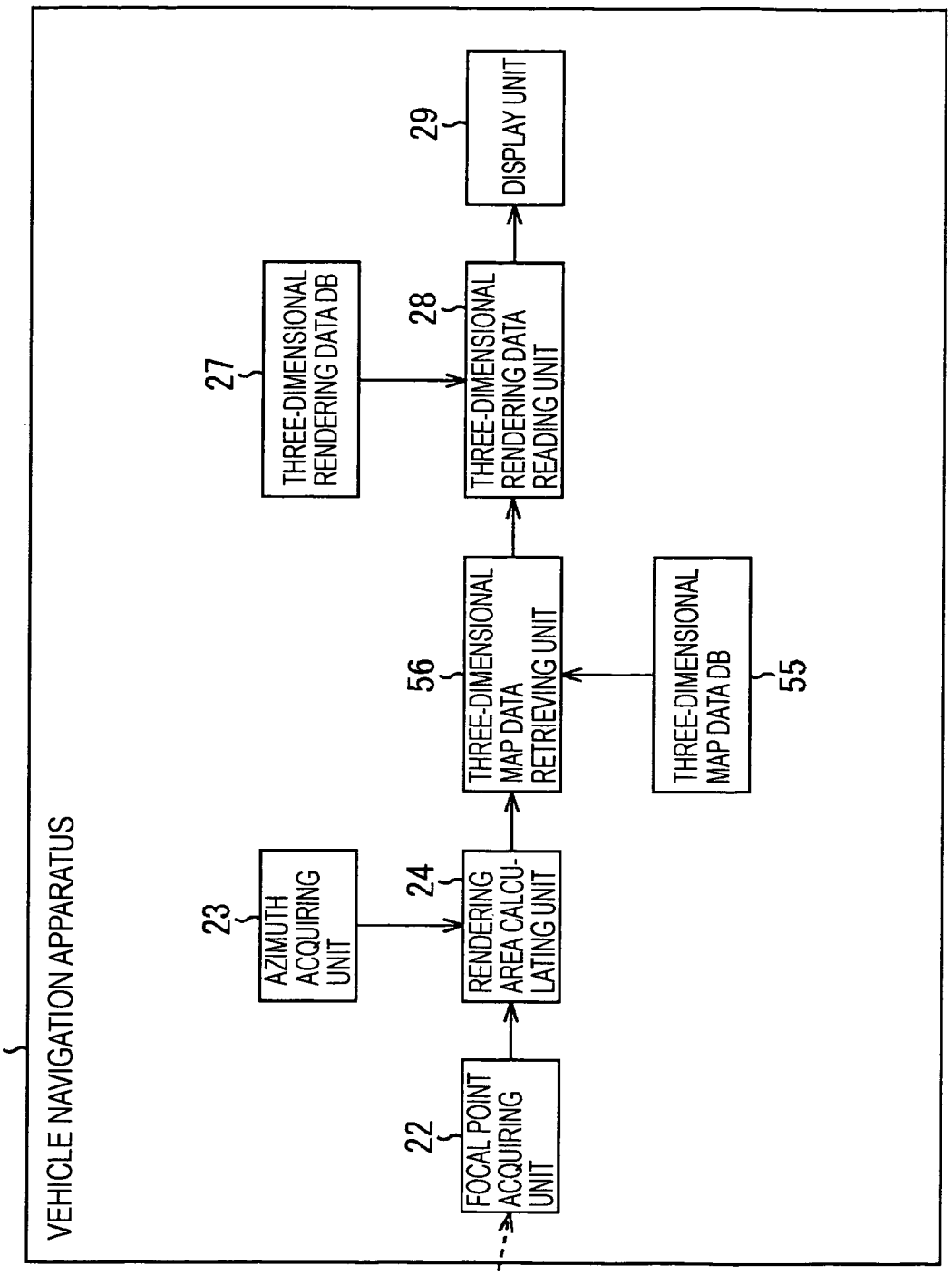
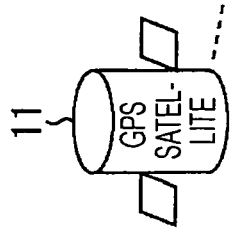

FIG. 9

| UNIT AREA | THREE-DIMENSIONAL MAP DATA | | | |
|---|---|---|---|---|
| $r_1$ | LOW-RISE DATA | MEDIUM-RISE DATA | HIGH-RISE DATA | SUPERHIGH-RISE DATA |
| $r_2$ | LOW-RISE DATA | MEDIUM-RISE DATA | HIGH-RISE DATA | SUPERHIGH-RISE DATA |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | | | |

FIG. 10
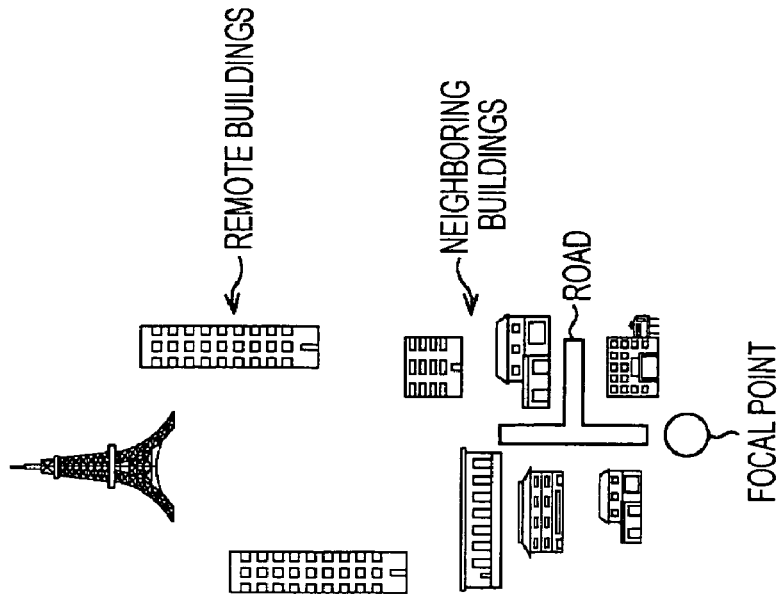
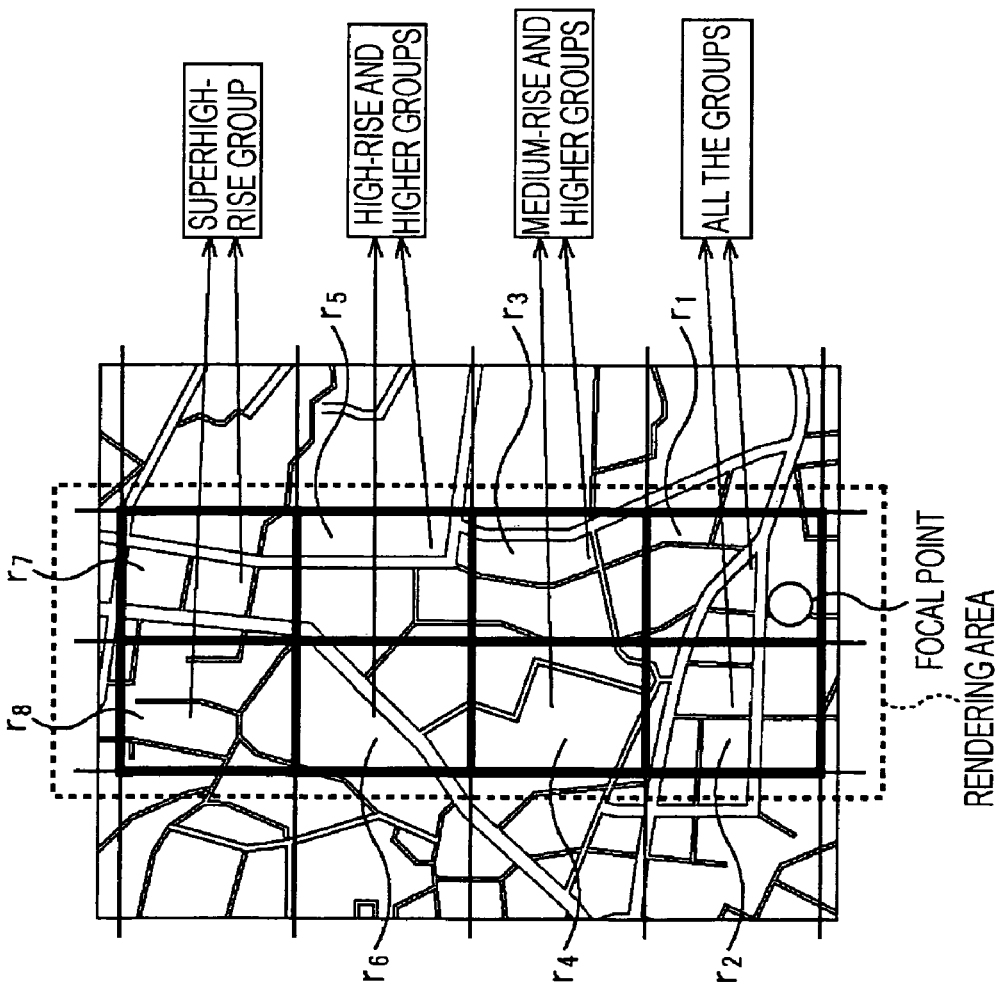

FIG. 18

| UNIT AREA | THREE-DIMENSIONAL MAP DATA | | | | |
|---|---|---|---|---|---|
| $r_1$ | LOW-RISE DATA | MEDIUM-RISE DATA | HIGH-RISE DATA | SUPERHIGH-RISE DATA | SUPERHIGH-RISE IMAGE DATA |
| $r_2$ | LOW-RISE DATA | MEDIUM-RISE DATA | HIGH-RISE DATA | SUPERHIGH-RISE DATA | SUPERHIGH-RISE IMAGE DATA |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |

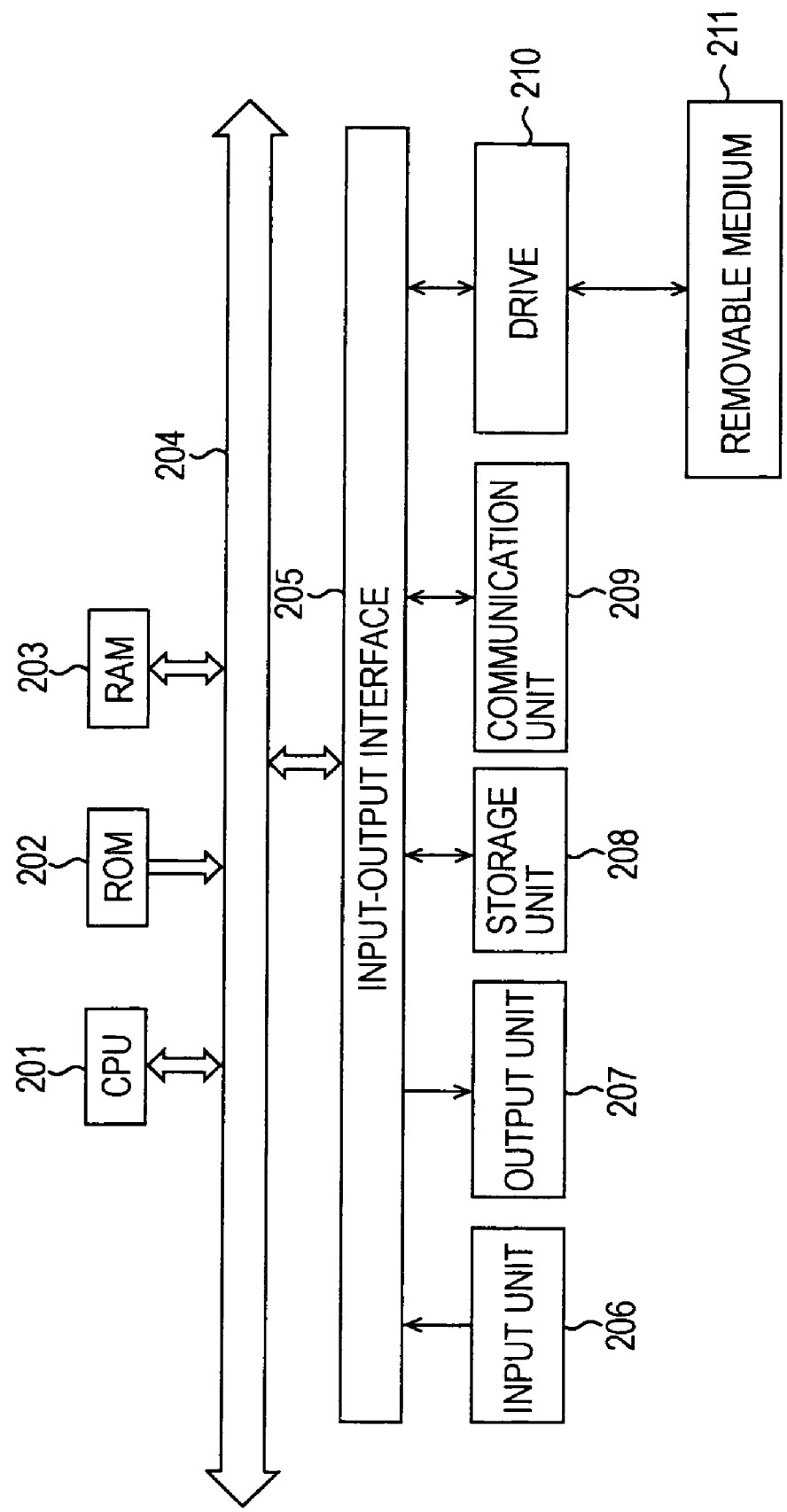

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2005-323134 filed in the Japanese Patent Office on Nov. 8, 2005, the entire contents of which are incorporated herein by reference.

BACKGROUND OF THE INVENTION

1. Field of the Invention

The present invention relates to information processing apparatuses, information processing methods, and programs. More particularly, the present invention relates to an information processing apparatus, an information processing method, and a program, which are capable of rapidly displaying a three-dimensional map with higher reality.

2. Description of the Related Art

For example, vehicle navigation systems render all rendering objects, such as buildings and interchanges, which are located within a predetermined geographical range with respect to a focal point, for example, the current position, to generate and display a three-dimensional map, which is a map composed of a three-dimensional image.

However, when the vehicle navigation systems render all the many rendering objects within a predetermined geographical range, the amount of rendering processing is increased and it takes much time to display the three-dimensional map.

In order to resolve the above problem, a method of varying the detail level of rendering in accordance with the distance from the focal point to generate a three-dimensional map is proposed (for example, refer to Japanese Unexamined Patent Application Publication No. 2005-56075). In this method, the detail level of rendering is decreased with the increasing distance from the focal point to the rendering object and the rendering objects, the distances to which from the focal point are longer than a predetermined distance, are not rendered.

Vehicle navigation systems that render only the rendering objects close to the focal point without varying the detail level and that do not render the rendering objects far from the focal point are also proposed.

FIGS. 1 to 4 illustrate such a vehicle navigation system in related art.

FIG. 1 is a block diagram showing an example of the configuration of the vehicle navigation system in the related art.

The vehicle navigation system includes a global positioning system (GPS) satellite 11 and a vehicle navigation apparatus 21. The vehicle navigation apparatus 21 includes a focal point acquiring unit 22, an azimuth acquiring unit 23, a rendering area calculating unit 24, a three-dimensional map data database (DB) 25, a three-dimensional map data retrieving unit 26, a three-dimensional rendering data DB 27, a three-dimensional rendering data reading unit 28, and a display unit 29. The vehicle navigation apparatus 21 is mounted in a vehicle, such as a car.

The GPS satellite 11 transmits a signal wave to the vehicle navigation apparatus 21.

The focal point acquiring unit 22 receives the signal wave transmitted from the GPS satellite 11, calculates the current position of the vehicle by a predetermined calculating method, and supplies the calculated current position as a focal point, which is a reference point used for defining a rendering area in which a three-dimensional map is generated, to the rendering area calculating unit 24. The focal point acquiring unit 22 acquires the focal point, for example, periodically or when the vehicle reaches an intersection. The focal point acquiring unit 22 may acquire a position on the map, specified by a user with an operation unit (not shown), such as a tablet, as the focal point.

The azimuth acquiring unit 23 uses, for example, a geomagnetic sensor or a gyroscope identifying the azimuth of the vehicle to detect (calculate) the azimuth of the vehicle and supplies the detected azimuth to the rendering area calculating unit 24. The azimuth acquiring unit 23 may acquire an azimuth from data indicating the azimuth, input by the user with the operation unit (not shown), such as the tablet.

The rendering area calculating unit 24 calculates a rendering area in which a three-dimensional map is generated on the basis of the focal point supplied from the focal point acquiring unit 22 and the azimuth supplied from the azimuth acquiring unit 23 and supplies the calculated rendering area to the three-dimensional map data retrieving unit 26.

The three-dimensional map data DB 25 has three-dimensional map data concerning the map recorded therein. The three-dimensional map data is used for generating a three-dimensional map. The three-dimensional map data includes rendering object data concerning the rendering objects, such as buildings, located in the rendering area, which is a geographical range.

The three-dimensional map data retrieving unit 26 retrieves, from the three-dimensional map data DB 25, the rendering object data within a predetermined range in the rendering area supplied from the rendering area calculating unit 24 and supplies the retrieved rendering object data to the three-dimensional rendering data reading unit 28.

The three-dimensional rendering data DB 27 has three-dimensional rendering data, such as data about a polygon or texture, recorded therein. The three-dimensional rendering data is necessary for generating a three-dimensional map, which is a three-dimensional image.

The three-dimensional rendering data reading unit 28 reads the three-dimensional rendering data necessary for generating a three-dimensional map from the three-dimensional rendering data DB 27 on the basis of the rendering object data supplied from the three-dimensional map data retrieving unit 26. In addition, the three-dimensional rendering data reading unit 28 performs rendering on the basis of the three-dimensional rendering data to generate a three-dimensional map, which is a three-dimensional image, and supplies the generated three-dimensional map to the display unit 29. The three-dimensional map is generated with respect to the focal point acquired by the focal point acquiring unit 22 toward the azimuth acquired by the azimuth acquiring unit 23.

The display unit 29 is, for example, a liquid crystal display (LCD). The display unit 29 displays the three-dimensional map supplied from the three-dimensional rendering data reading unit 28.

In the vehicle navigation apparatus 21 having the above configuration, the current position acquired as the focal point by the focal point acquiring unit 22 and the azimuth of the vehicle, acquired by the azimuth acquiring unit 23, are supplied to the rendering area calculating unit 24. The rendering area calculating unit 24 calculates the rendering area on the basis of the focal point supplied from the focal point acquiring unit 22 and the azimuth supplied from the azimuth acquiring unit 23 and supplies the calculated rendering area to the three-dimensional map data retrieving unit 26. The three-dimensional map data retrieving unit 26 retrieves, from the three-dimensional map data DB 25, the rendering object data within the rendering area supplied from the rendering area calculating unit 24 and supplies the retrieved rendering object data to the three-dimensional rendering data reading unit 28. The three-dimensional rendering data reading unit 28 reads the three-dimensional rendering data from the three-dimensional rendering data DB 27 on the basis of the rendering object data supplied from the three-dimensional map data retrieving unit 26 and performs the rendering on the basis of the three-dimensional rendering data to generate a three-dimensional map, which is a three-dimensional image. The three-dimensional rendering data reading unit 28 supplies the generated three-dimensional map to the display unit 29 that displays the three-dimensional map.

FIG. 2 schematically shows three-dimensional map data recorded in the three-dimensional map data DB 25 in FIG. 1.

In the three-dimensional map data DB 25, the three-dimensional map data is divided into, for example, pieces of data in rectangular areas (hereinafter appropriately referred to as "unit areas") and the pieces of data in the unit areas are stored in files. The rectangular areas are given by segmenting the map in the latitude and longitude directions into an array. The three-dimensional map data includes the rendering object data concerning the rendering objects, such as buildings, located within each unit area.

In the vehicle navigation apparatus 21 shown in FIG. 1, the rendering area calculating unit 24 calculates unit areas included in a range a predetermined distance from a line segment that has a predetermined length and that extends from the focal point acquired by the focal point acquiring unit 22 toward the azimuth acquired by the azimuth acquiring unit 2. The calculated unit areas are set as the rendering area. Referring to FIG. 2, two (latitude direction)×four (longitude direction) unit areas, surrounded by a broken line, are set as the rendering area.

The three-dimensional map data retrieving unit 26 determines two unit areas in the rendering object data concerning the rendering objects in the rendering area to be a neighboring region close to the focal point. The two unit areas, surrounded by a bold line, include a unit area including the focal point and a unit area closest to the unit area including the focal point. The three-dimensional map data retrieving unit 26 retrieves the rendering object data concerning the rendering objects within the unit areas, which is in the neighboring region, from the three-dimensional map data DB 25 and supplies the retrieved rendering object data to the three-dimensional rendering data reading unit 28.

The three-dimensional rendering data reading unit 28 renders the rendering objects on the basis of the rendering object data supplied from the three-dimensional map data retrieving unit 26 to generate a three-dimensional map and supplies the generated three-dimensional map to the display unit 29.

The three-dimensional map displayed in the display unit 29 in the manner described above will now be described with reference to FIGS. 3 and 4.

FIG. 3 schematically shows rendering objects within a rendering area.

Referring to FIG. 3, the rendering objects are located in both the neighboring region close to the focal point and a remote region far from the focal point, in the rendering area.

FIG. 4 schematically shows a three-dimensional map generated for the rendering area shown in FIG. 3.

If all the rendering objects located in the rendering area shown in FIG. 3 are rendered, both the rendering objects in the neighboring region and those in the remote region are displayed in the three-dimensional map, as shown on the left side in FIG. 4.

In contrast, if only the rendering objects located in the neighboring region in the rendering area shown in FIG. 3 are rendered, the rendering objects in the neighboring region are displayed in the three-dimensional map but the rendering objects in the remote region are not displayed therein, as shown on the right side in FIG. 4.

SUMMARY OF THE INVENTION

As described above, if the rendering objects far from the focal point are not rendered, the rendering objects, such as buildings, serving as landmarks are possibly not displayed in the three-dimensional map. Accordingly, the three-dimensional map with lower reality can be generated.

It is desirable to rapidly generate a three-dimensional map with higher reality.

According to an embodiment of the present invention, an information processing apparatus generating a three-dimensional map, which is a three-dimensional image, on the basis of three-dimensional map data concerning the three-dimensional map includes rendering area acquiring means for acquiring a rendering area, which is a geographical range in which the three-dimensional map is generated with respect to a focal point; identifying means for identifying the three-dimensional map data in the rendering area, among the three-dimensional map data including rendering object data that concerns at least one rendering object rendered in order to generate the three-dimensional map and that is hierarchized into multiple groups in accordance with characteristics of the rendering object; rendering object data acquiring means for selecting a group on the basis of the distance from the focal point and acquiring the rendering object data in the selected group from the three-dimensional map data in the rendering area; and three-dimensional map generating means for rendering the rendering object on the basis of the rendering object data acquired from the three-dimensional map data in the rendering area to generate the three-dimensional map.

The rendering object data may be hierarchized on the basis of the height of the rendering object. The rendering object data acquiring means may select all the groups when the distance from the focal point is short and may select only higher-rise groups with the increasing distance from the focal point.

The three-dimensional map generating means may use image data yielded by rendering in advance the specific rendering object to generate the three-dimensional map, for specific rendering object corresponding to the rendering object data in a specific group.

The rendering object data acquiring means may acquire the rendering object data concerning the rendering object close to the focal point, and may limit the groups to be selected if an amount of processing necessary for the rendering on the basis of the acquired rendering object data exceeds a predetermined limit value.

The rendering object data may be hierarchized on the basis of the height of the rendering object, the altitude of a position where the rendering object is located, or the identification level of the rendering object.

According to another embodiment of the present invention, an information processing method generates a three-dimensional map, which is a three-dimensional image, on the basis of three-dimensional map data concerning the three-dimensional map. According to another embodiment of the present invention, a program causes a computer to perform information processing for generating a three-dimensional map, which is a three-dimensional image, on the basis of three-dimensional map data concerning the three-dimensional map. The information processing method and the program include the steps of acquiring a rendering area, which is a geographical range in which the three-dimensional map is generated with respect to a focal point; identifying the three-dimensional map data in the rendering area, among the three-dimensional map data including rendering object data that concerns at least one rendering object rendered in order to generate the three-dimensional map and that is hierarchized into multiple groups in accordance with characteristics of the rendering object; selecting a group on the basis of the distance from the focal point and acquiring the rendering object data in the selected group from the three-dimensional map data in the rendering area; and rendering the rendering object on the basis of the rendering object data acquired from the three-dimensional map data in the rendering area to generate the three-dimensional map.

In the information processing apparatus, the information processing method, and the program, a rendering area is acquired which is a geographical range in which the three-dimensional map is generated with respect to a focal point. The three-dimensional map data in the rendering area is identified among the three-dimensional map data including rendering object data that concerns at least one rendering object rendered in order to generate the three-dimensional map and that is hierarchized into multiple groups in accordance with characteristics of the rendering object. A group is selected on the basis of the distance from the focal point and the rendering object data in the selected group is acquired from the three-dimensional map data in the rendering area. The rendering object is rendered on the basis of the rendering object data acquired from the three-dimensional map data in the rendering area to generate the three-dimensional map.

According to the present invention, it is possible to rapidly generate the three-dimensional map with higher reality.

BRIEF DESCRIPTION OF THE DRAWINGS

FIG. 6 is a block diagram showing a first example of the configuration of a vehicle navigation apparatus in FIG. 5;

FIG. 9 is a table showing an example of the content of data stored (recorded) in the three-dimensional map data DB in FIG. 6;

FIG. 10 schematically shows rendering objects located in a rendering area calculated by a rendering area calculating unit in FIG. 6;

FIG. 18 is a table showing an example of the content of data stored (recorded) in the three-dimensional map data DB in FIG. 16; and FIG. 19 is a block diagram showing an example of the configuration of a computer according to an embodiment of the present invention.

DESCRIPTION OF THE PREFERRED EMBODIMENTS

Figure 1:
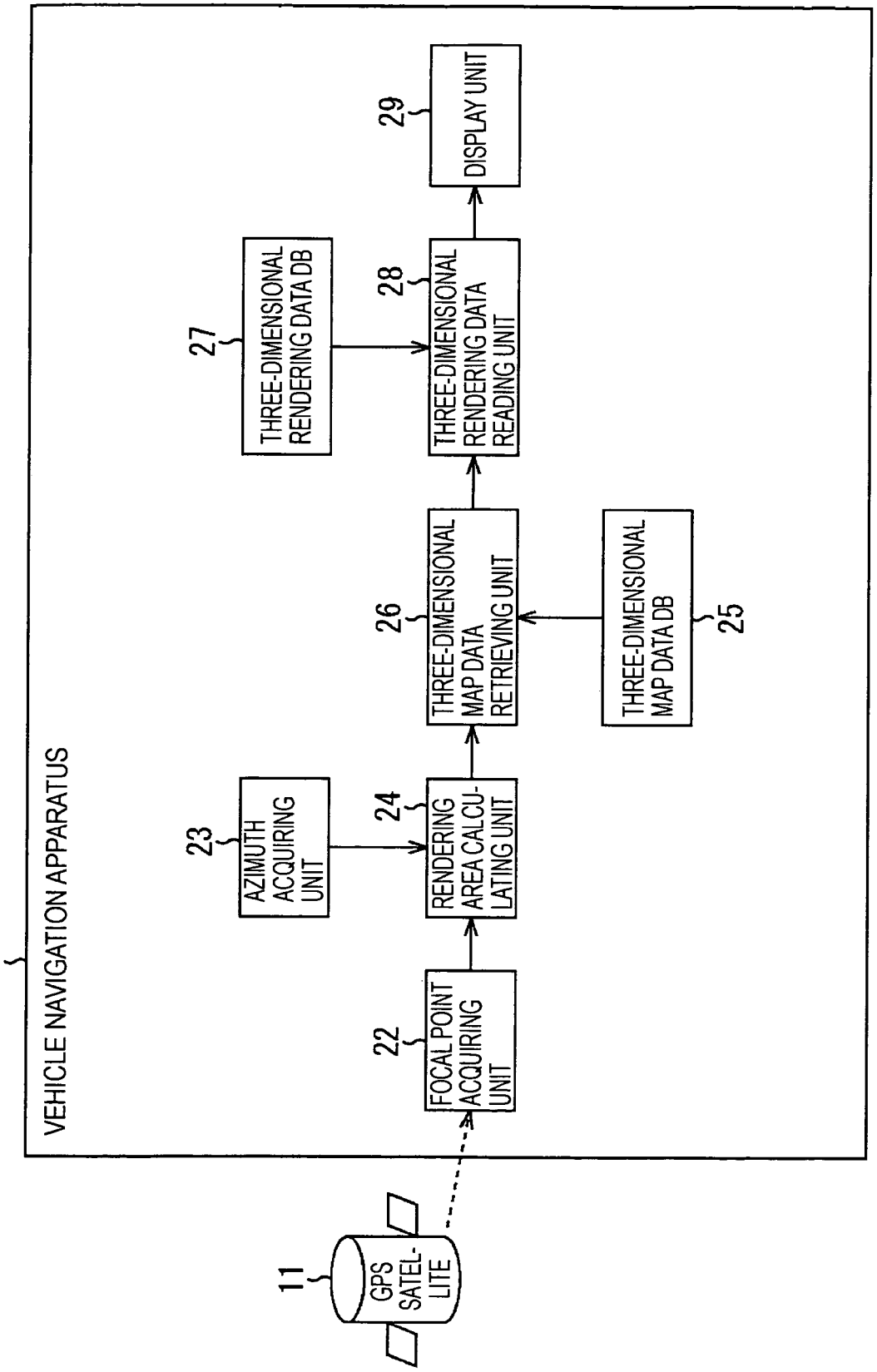
FIG. 1 is a block diagram showing an example of the structure of a vehicle navigation system in related art.
Figure 2:
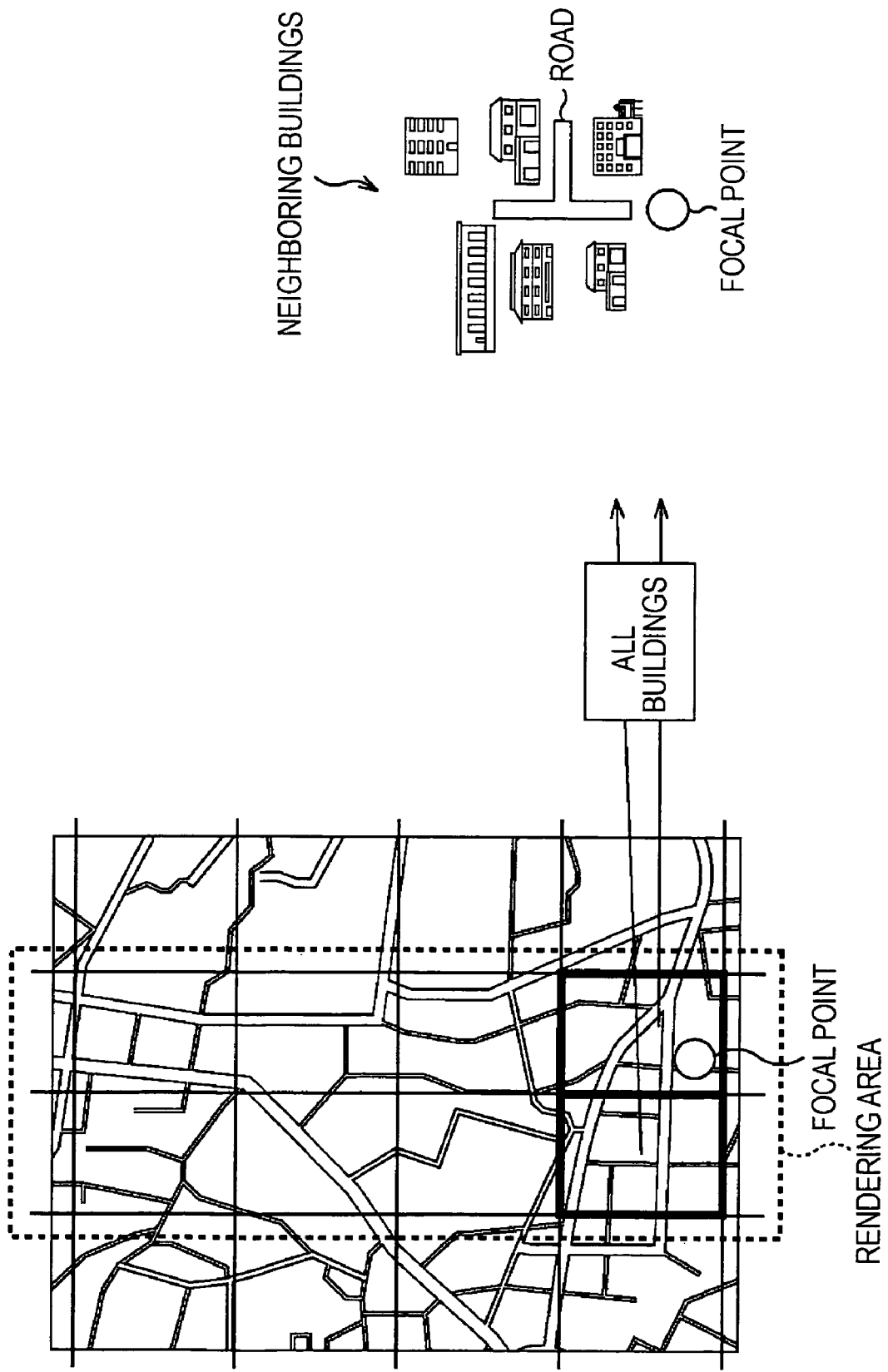
FIG. 2 schematically shows three-dimensional map data recorded in a three-dimensional map data DB in FIG. 1.
Figure 3:
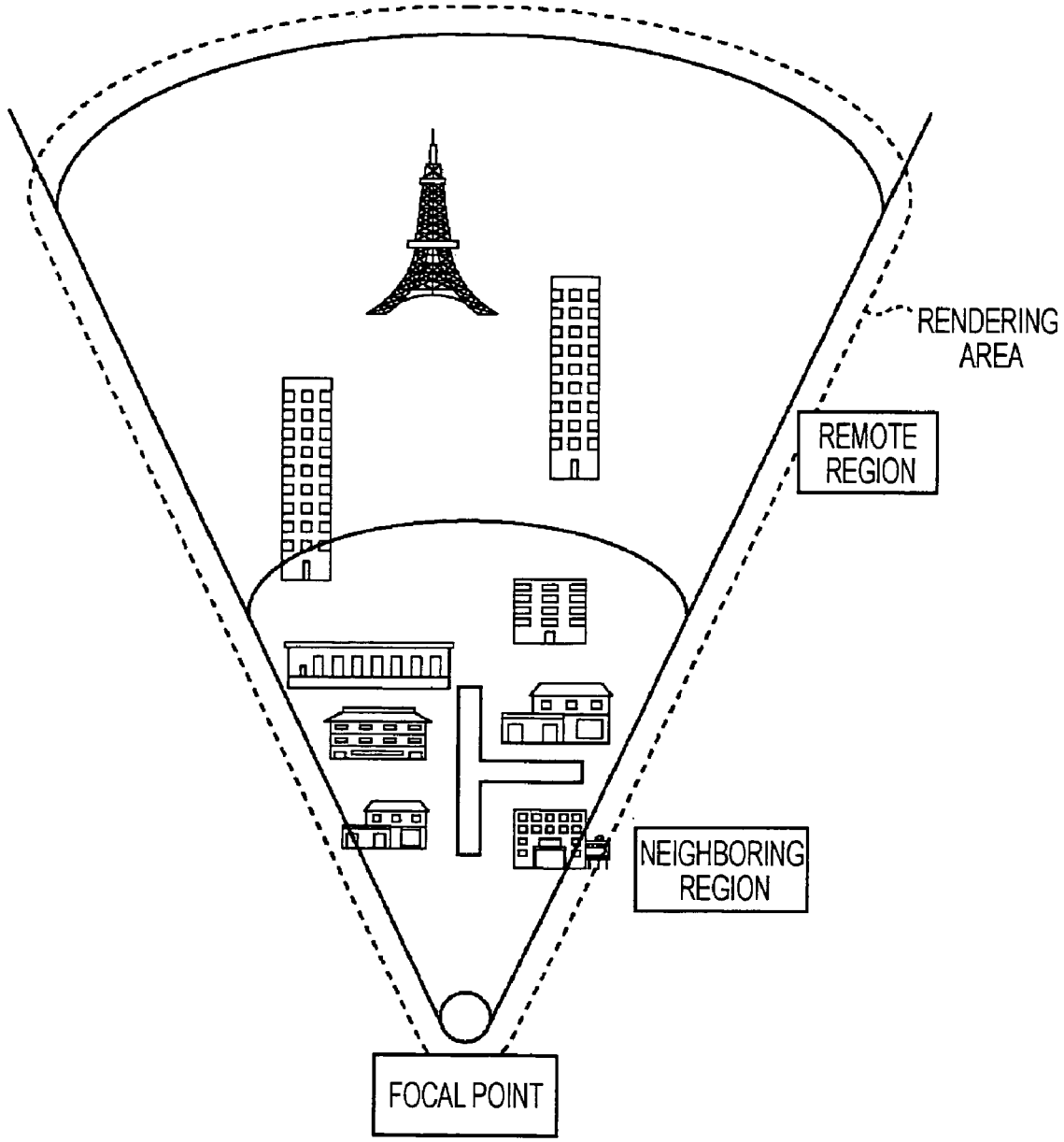
FIG. 3 schematically shows rendering objects located in a rendering area calculated by a rendering area calculating unit in FIG. 1.
Figure 4:
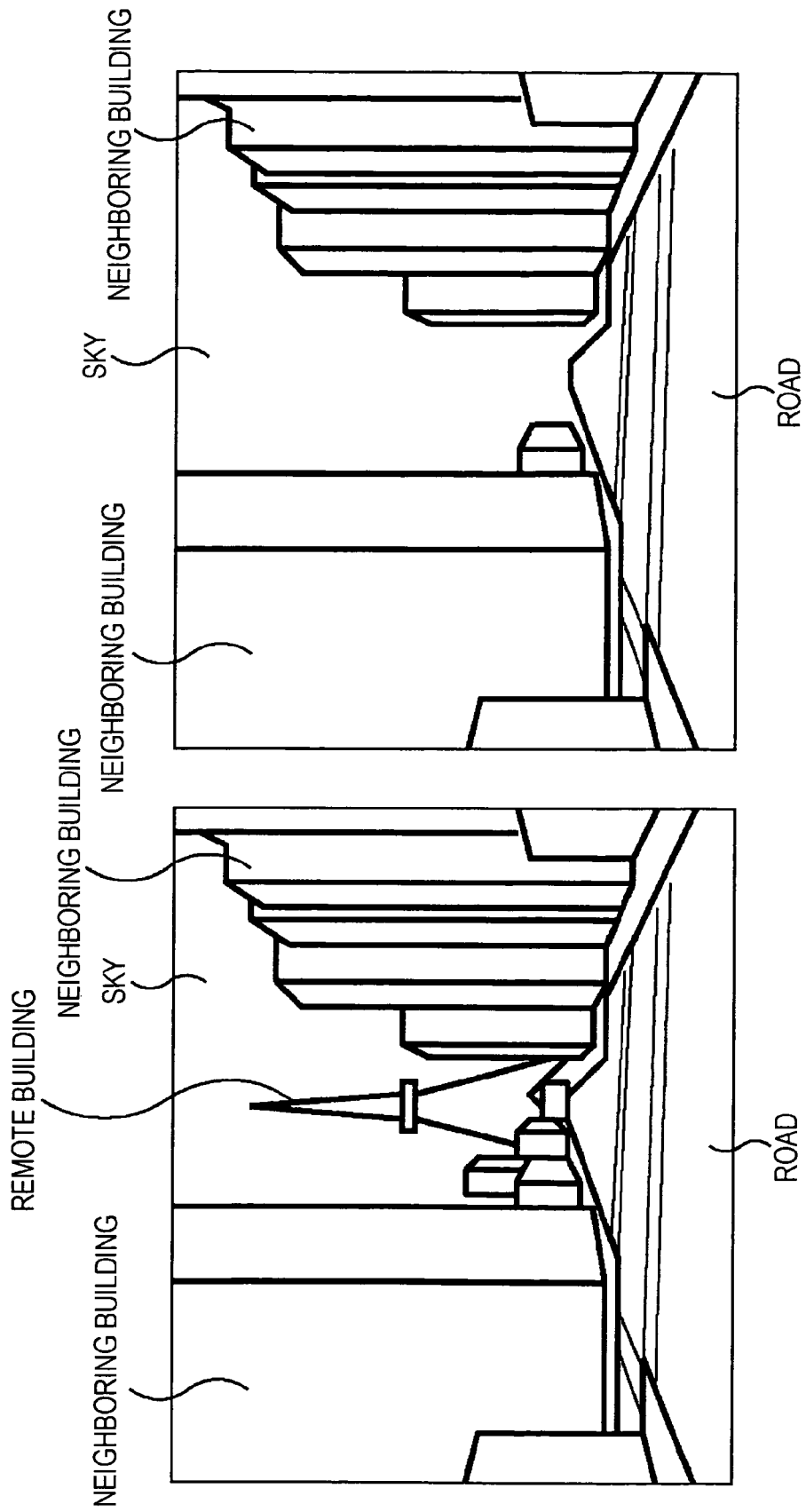
FIG. 4 schematically shows a three-dimensional map generated for the rendering area shown in FIG. 3.

Before describing embodiments of the present invention, the correspondence between the features of the claims and the specific elements disclosed in embodiments of the specification or the drawings is discussed below. This description is intended to assure that embodiments supporting the claimed invention are described in this specification or the drawings. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An information processing apparatus (for example, a vehicle navigation apparatus 52 in FIG. 5) according to an embodiment of the present invention generates a three-dimensional map, which is a three-dimensional image, on the basis of three-dimensional map data concerning the three-dimensional map. The information processing apparatus includes rendering area acquiring means (for example, a rendering area calculating unit 24 in FIG. 6) for acquiring a rendering area, which is a geographical range in which the three-dimensional map is generated with respect to a focal point; identifying means (for example, a three-dimensional map data retrieving unit 56 in FIG. 6 performing Step S21 in FIG. 14) for identifying the three-dimensional map data in the rendering area, among the three-dimensional map data including rendering object data that concerns at least one rendering object rendered in order to generate the three-dimensional map and that is hierarchized into multiple groups in accordance with characteristics of the rendering object; rendering object data acquiring means (for example, the three-dimensional map data retrieving unit 56 in FIG. 6 performing Step S22 in FIG. 14) for selecting a group on the basis of the distance from the focal point and acquiring the rendering object data in the selected group from the three-dimensional map data in the rendering area; and three-dimensional map generating means (for example, a three-dimensional rendering data reading unit 28 in FIG. 6) for rendering the rendering object on the basis of the rendering object data acquired from the three-dimensional map data in the rendering area to generate the three-dimensional map.

An information processing method according to another embodiment of the present invention generates a three-dimensional map, which is a three-dimensional image, on the basis of three-dimensional map data concerning the three-dimensional map. A program according to another embodiment of the present invention causes a computer to perform information processing for generating a three-dimensional map, which is a three-dimensional image, on the basis of three-dimensional map data concerning the three-dimensional map. The information processing method and the program include the steps of acquiring a rendering area, which is a geographical range in which the three-dimensional map is generated with respect to a focal point (for example, Step S13 in FIG. 13); identifying the three-dimensional map data in the rendering area, among the three-dimensional map data including rendering object data that concerns at least one rendering object rendered in order to generate the three-dimensional map and that is hierarchized into multiple groups in accordance with characteristics of the rendering object (for example, Step S21 in FIG. 14); selecting a group on the basis of the distance from the focal point and acquiring the rendering object data in the selected group from the three-dimensional map data in the rendering area (for example, Step S22 in FIG. 14); and rendering the rendering object on the basis of the rendering object data acquired from the three-dimensional map data in the rendering area to generate the three-dimensional map (for example, Step S15 in FIG. 13).

Embodiments of the present invention will be described with reference to the accompanying drawings.

Figure 5:
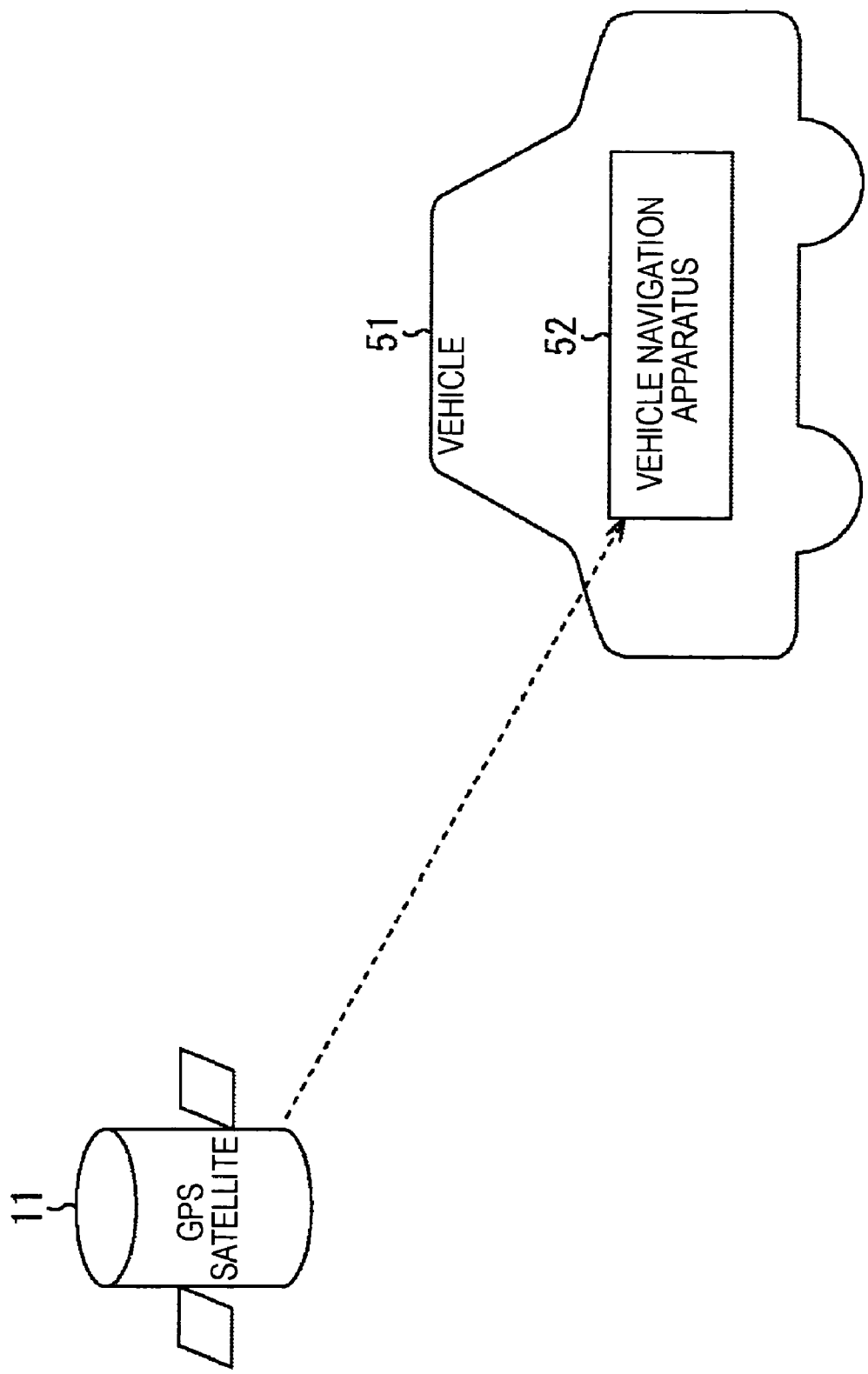
FIG. 5 shows an example of the structure of a vehicle navigation system according to an embodiment of the present invention.

FIG. 5 shows an example of the structure of a vehicle navigation system according to an embodiment of the present invention.

The vehicle navigation system includes a GPS satellite 11 and a vehicle 51, such as a car. The vehicle 51 has a vehicle navigation apparatus 52 mounted therein.

The GPS satellite 11 transmits a signal wave to the vehicle 51 (the vehicle navigation apparatus 52), like the GPS satellite 11 in FIG. 1.

The vehicle navigation apparatus 52 receives the signal wave transmitted from the GPS satellite 11 and calculates the current position of the vehicle 51 as the focal point by a predetermined calculating method, like the vehicle navigation apparatus 21 in FIG. 1. The vehicle navigation apparatus 52 acquires the azimuth of the vehicle 51 by the use of, for example, a geomagnetic sensor to calculate a rendering area, which is a range on the map where a three-dimensional map is to be rendered, on the basis of the focal point and the azimuth. The vehicle navigation apparatus 52 generates a three-dimensional map on the basis of three-dimensional map data in the rendering area and displays the generated three-dimensional map.

FIG. 6 is a block diagram showing a first example of the configuration of the vehicle navigation apparatus 52 in FIG. 5.

The same reference numerals are used in FIG. 6 to identify the same components shown in FIG. 1. A detailed description of such components is omitted herein.

The vehicle navigation apparatus 52 in FIG. 6 has a configuration similar to that of the vehicle navigation apparatus 21 in FIG. 1, except that the vehicle navigation apparatus 52 includes a three-dimensional map data DB 55 and a three-dimensional map data retrieving unit 56, instead of the three-dimensional map data DB 25 and the three-dimensional map data retrieving unit 26, respectively, in FIG. 1.

The three-dimensional map data DB 55 has three-dimensional map data recorded therein. The three-dimensional map data recorded in the three-dimensional map data DB 55 is divided into pieces of data in rectangular unit areas and the pieces of data in the unit areas are stored in files, like the three-dimensional map data recorded in the three-dimensional map data DB 25 in FIG. 1. The rectangular unit areas are given by segmenting the map in the latitude and longitude directions into an array. The three-dimensional map data includes rendering object data concerning the rendering objects, such as buildings, located within each unit area. However, the rendering object data included in the three-dimensional map data for every unit area recorded in the three-dimensional map data DB 55 is hierarchized into multiple groups in accordance with the characteristics of the rendering objects, such as the heights of the buildings being the rendering objects, the altitudes of the positions where the rendering objects are located, and the identification level of the rendering objects.

A rendering area is supplied from the rendering area calculating unit 24 to the three-dimensional map data retrieving unit 56. The three-dimensional map data retrieving unit 56 divides the rendering area into multiple areas in accordance with the distances from the focal point to the areas and selects a group for the rendering object data in each area on the basis of the distance from the focal point to the area. The three-dimensional map data retrieving unit 56 reads the rendering object data in the selected group from the three-dimensional map data DB 55 and supplies the read rendering object data to the three-dimensional rendering data reading unit 28.

The three-dimensional map data retrieving unit 56 may limit the groups to be selected in accordance with the amount of processing necessary for the rendering on the basis of the rendering object data read from the three-dimensional map data DB 55.

The three-dimensional map data recorded in the three-dimensional map data DB 55 in FIG. 6 will now be described in detail with reference to FIGS. 7 to 9.

Figure 7:
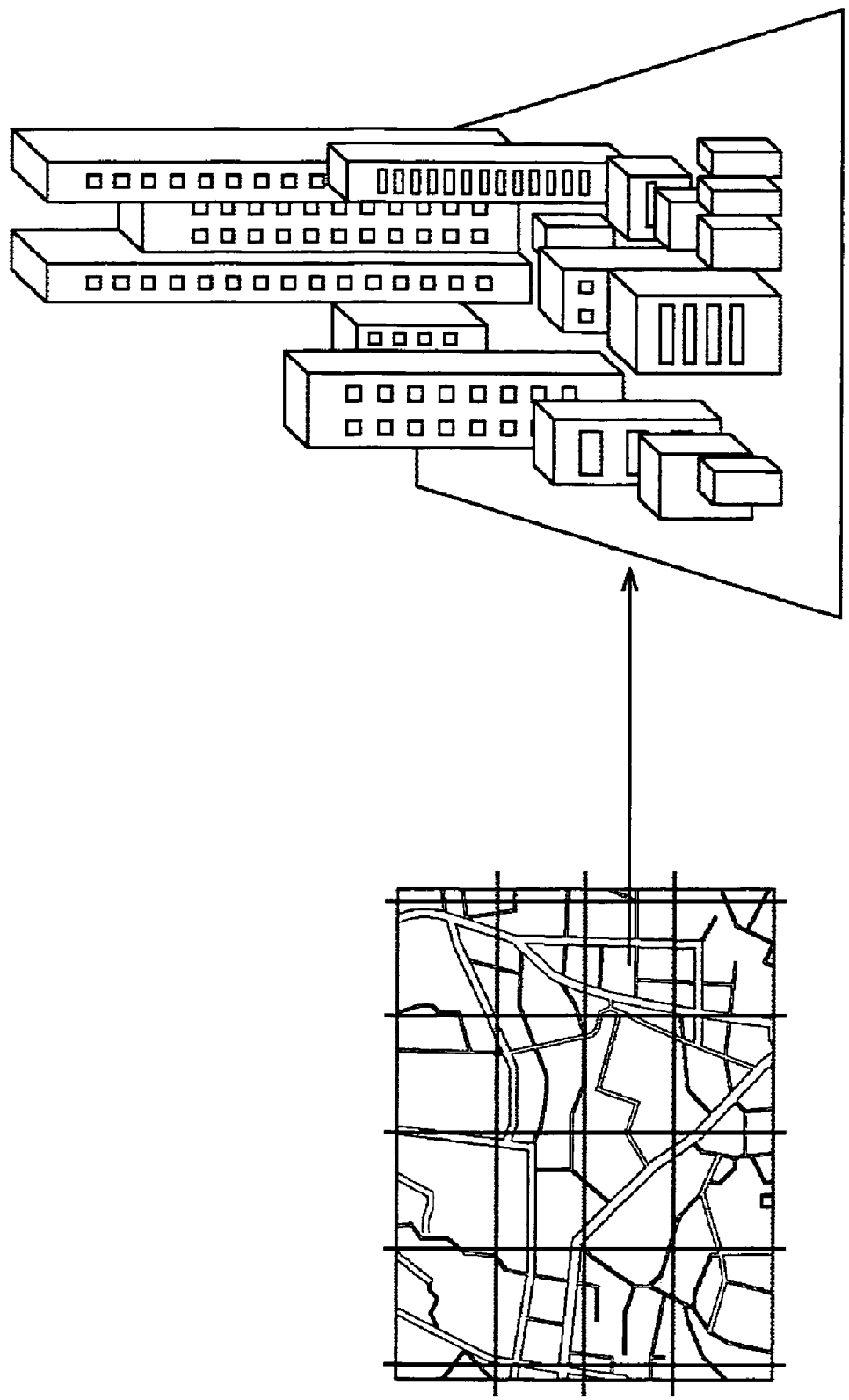
FIG. 7 schematically shows three-dimensional map data recorded in a three-dimensional map data DB in FIG. 6.

FIG. 7 schematically shows three-dimensional map data recorded in the three-dimensional map data DB 55 in FIG. 6.

The three-dimensional map data recorded in the three-dimensional map data DB 55 is divided into pieces of data in rectangular unit areas and the pieces of data in the unit areas are stored in files, as shown on the left side in FIG. 7. The rectangular unit areas are given by segmenting the map in the latitude and longitude directions into an array. The three-dimensional map data in each unit area includes the rendering object data concerning the rendering objects, such as buildings, located in the unit area, as shown on the right side in FIG. 7.

Figure 8:
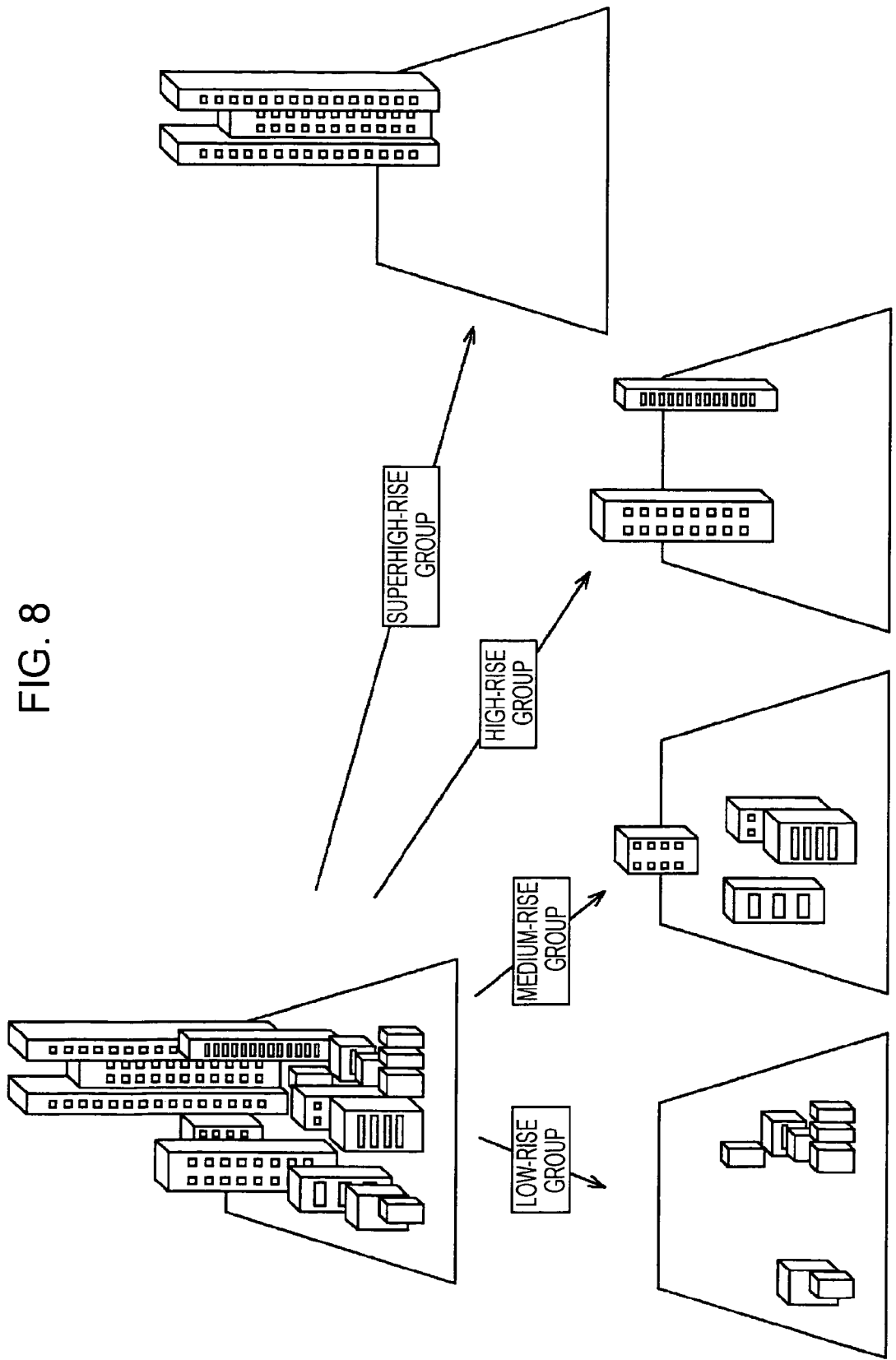
FIG. 8 schematically shows the rendering object data in unit areas included in the three-dimensional map data recorded in the three-dimensional map data DB in FIG. 6.

The rendering object data included in the three-dimensional map data in each unit area, recorded in the three-dimensional map data DB 55, is hierarchized into multiple groups, as shown in FIG. 8.

FIG. 8 schematically shows the rendering object data in unit areas.

Referring to FIG. 8, the rendering object data included in the three-dimensional map data for every unit area, that is, the rendering object data concerning the rendering objects located in each unit area, is hierarchized into four groups including low-rise, medium-rise, high-rise, and superhigh-rise groups in accordance with the characteristics of the rendering objects, such as the heights of the buildings being the rendering objects, the altitudes of the positions where the rendering objects are located, and the identification level of the rendering objects, that is, in accordance with how visible the rendering objects are when they are viewed from far away.

Specifically, the rendering object data concerning the rendering objects, such as low buildings (including two-story houses and road signs), which are not visible when they are viewed from far away (for example, which are almost invisible) is hierarchized (grouped) into the low-rise group. The rendering object data concerning the rendering objects, such as medium-high buildings (including moderately-sized buildings and freeways with certain degrees of height), which are hardly visible when they are viewed from far away (for example, which can be seen to some extent) is hierarchized into the medium-rise group. The rendering object data concerning the rendering objects, such as buildings with a certain degree of height (including high-rise buildings and elevated bridges), which are visible to some extent when they are viewed from far away (for example, which can be well seen) is hierarchized into the high-rise group. The rendering object data concerning the rendering objects, such as very high buildings (including skyscrapers, towers, and high mountains), which are highly visible when they are viewed from far away (for example, which can be extremely well seen) is hierarchized into the superhigh-rise group.

The rendering object data in the low-rise, medium-rise, high-rise, and superhigh-rise groups is hereinafter also referred to as low-rise data, medium-rise data, high-rise data, and superhigh-rise data, respectively.

Among the low-rise, medium-rise, high-rise, and superhigh-rise groups, the low-rise group is called the bottom layer group and the superhigh-rise group is called the top layer group.

In addition, the rendering objects corresponding to the rendering object data in the low-rise, medium-rise, high-rise, and superhigh-rise groups are hereinafter also referred to as low-rise, medium-rise, high-rise, and superhigh-rise rendering objects, respectively.

FIG. 9 is a table showing an example of the content of data stored (recorded) in the three-dimensional map data DB 55.

The three-dimensional map data DB 55 includes the low-rise data, the medium-rise data, the high-rise data, and the superhigh-rise data for every unit area $r_1, r_2, \ldots$, as shown in FIG. 9.

Some unit areas do not contain all of the low-rise data, the medium-rise data, the high-rise data, and the superhigh-rise data. For example, the three-dimensional map data in the unit area where very high buildings do not exist does not include the superhigh-rise data.

The three-dimensional map generated by the vehicle navigation apparatus 52 in FIG. 6 will now be described with reference to FIGS. 10 to 12.

FIG. 10 schematically shows rendering objects located in a rendering area.

For example, it is assumed that the rendering area calculating unit 24 in the vehicle navigation apparatus 52 in FIG. 6 calculates a total of eight unit areas $r_1, r_2, r_3, r_4, r_5, r_6, r_7$, and $r_8$ to be included the rendering area. The rendering area includes the focal point and includes two areas in the lateral direction and four areas in the longitudinal direction, surrounded by a broken line in FIG. 10. The three-dimensional map data retrieving unit 56 selects all of the low-rise, medium-rise, high-rise, and superhigh-rise groups for the unit area $r_1$ closest to the focal point and the unit area $r_2$ second closest to the focal point, in the rendering area, and reads (retrieves) the rendering object data in all the groups, that is, the low-rise, medium-rise, high-rise, and superhigh-rise data from the three-dimensional map data DB 55.

The three-dimensional map data retrieving unit 56 selects the medium-rise, high-rise, and superhigh-rise groups, among the low-rise, medium-rise, high-rise, and superhigh-rise groups, for the unit area $r_3$ third closest to the focal point and the unit area $r_4$ fourth closest to the focal point, in the rendering area, and retrieves the rendering object data in the medium-rise, high-rise, and superhigh-rise groups, that is, the medium-rise, high-rise, and superhigh-rise data from the three-dimensional map data DB 55.

The three-dimensional map data retrieving unit 56 selects the high-rise and superhigh-rise groups, among the low-rise, medium-rise, high-rise, and superhigh-rise groups, for the unit area $r_5$ fifth closest to the focal point and the unit area $r_6$ sixth closest to the focal point, in the rendering area, and retrieves the rendering object data in the high-rise and superhigh-rise groups, that is, the high-rise and superhigh-rise data from the three-dimensional map data DB 55.

The three-dimensional map data retrieving unit 56 selects only the superhigh-rise group, among the low-rise, medium-rise, high-rise, and superhigh-rise groups, for the unit area $r_7$ seventh closest to (second farthest from) the focal point and the unit area $r_8$ eighth closest to (farthest from) the focal point, in the rendering area, and retrieves the rendering object data in the superhigh-rise group, that is, the superhigh-rise data from the three-dimensional map data DB 55.

Figure 11:
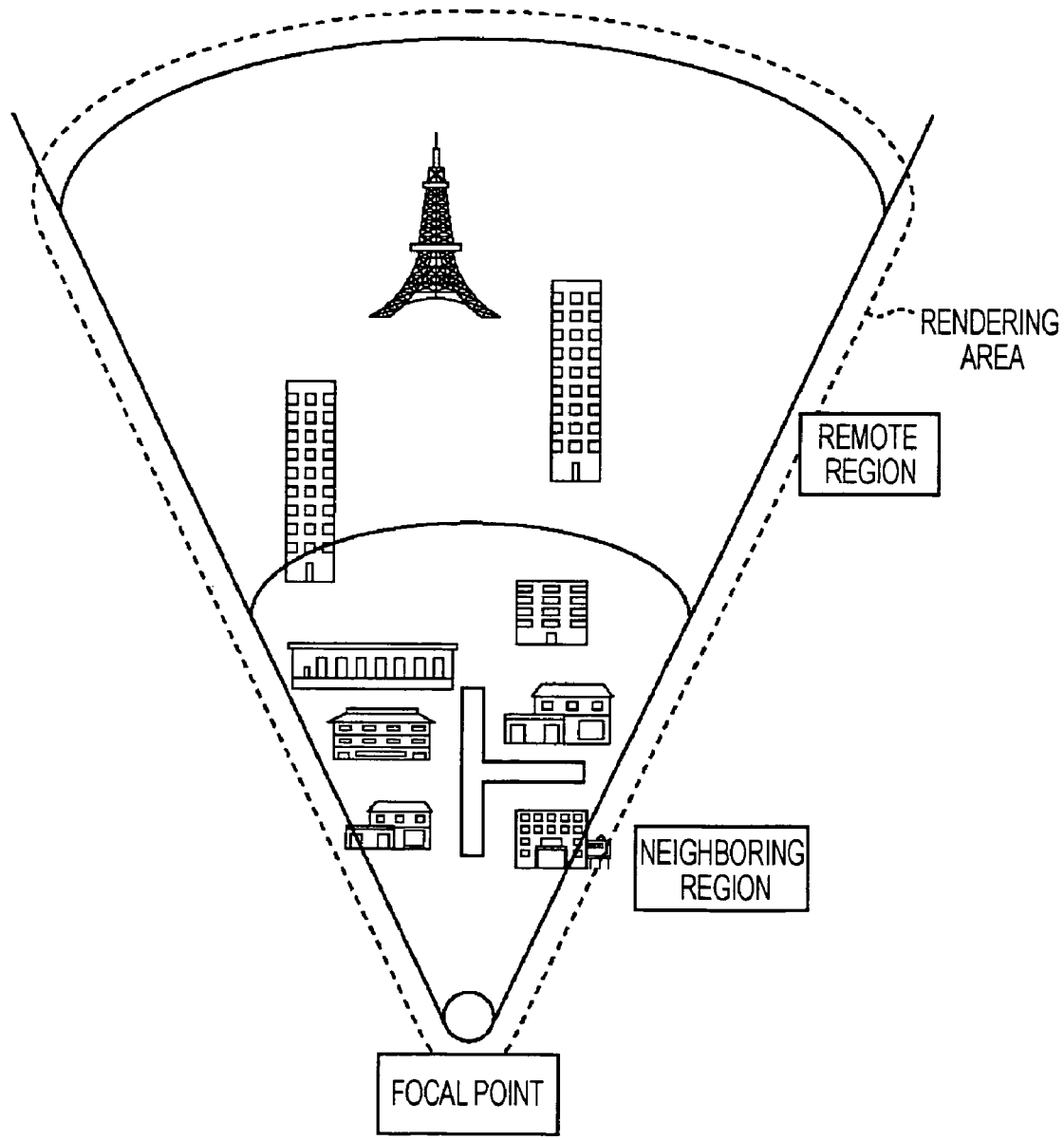
FIG. 11 schematically shows rendering object data retrieved by a three-dimensional map data retrieving unit in FIG. 6.

FIG. 11 schematically shows rendering object data retrieved by the three-dimensional map data retrieving unit 56.

As shown in FIG. 11, the rendering object data concerning the low buildings to very high buildings (the low-rise, medium-rise, high-rise, and superhigh-rise data) is retrieved for the neighboring region close to the focal point, that is, for example, for the unit areas $r_1$ and $r_2$ in FIG. 10. In contrast, the rendering object data concerning only the very high buildings (the superhigh-rise data) is retrieved for the remote region far from the focal point, that is, for example, for the unit areas $r_7$ and $r_8$ in FIG. 10.

Figure 12:
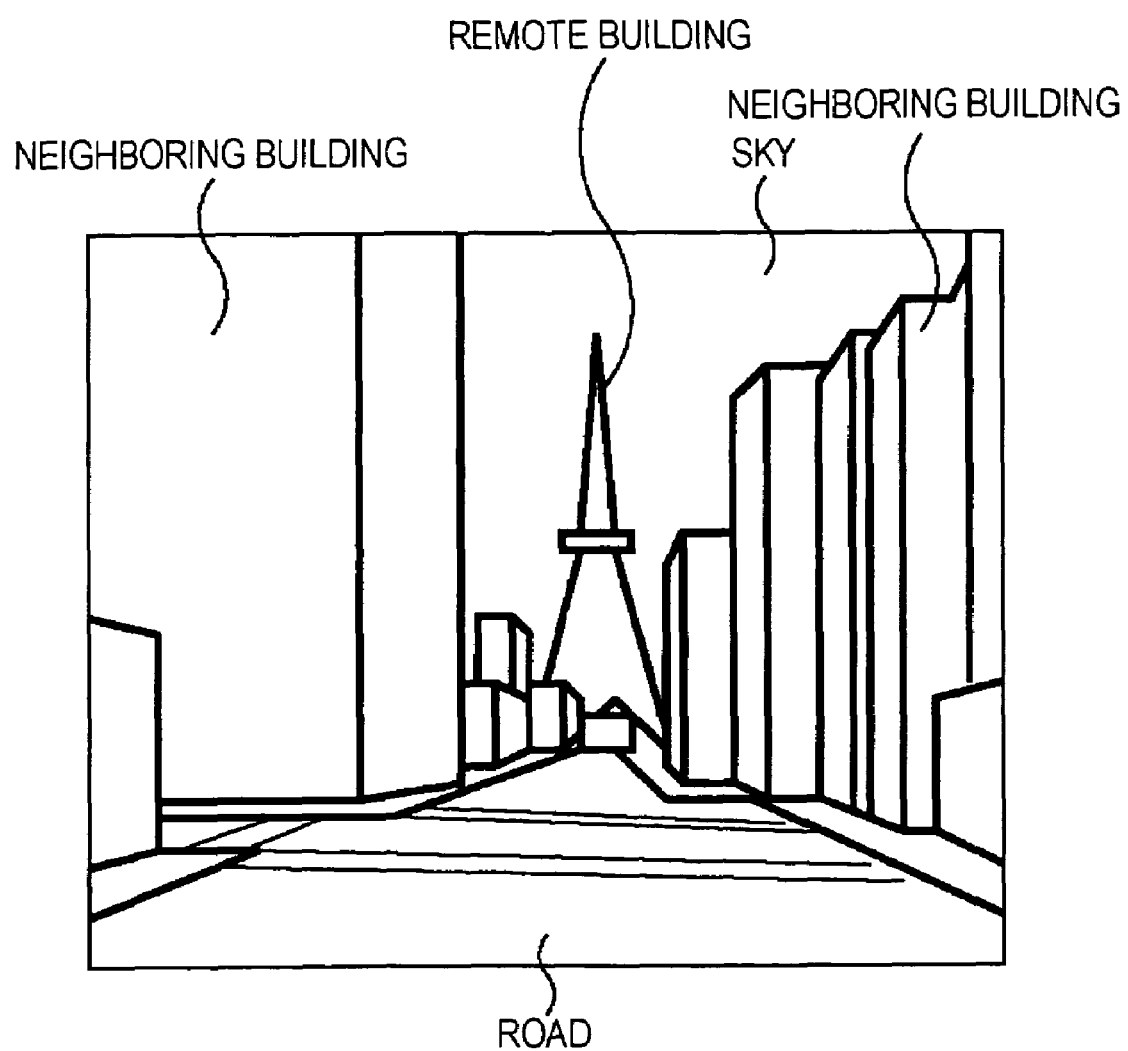
FIG. 12 schematically shows a three-dimensional map generated by a three-dimensional rendering data reading unit on the basis of the rendering object data retrieved by the three-dimensional map data retrieving unit in FIG. 6.

FIG. 12 schematically shows a three-dimensional map generated by the three-dimensional rendering data reading unit 28 on the basis of the rendering object data retrieved by the three-dimensional map data retrieving unit 56.

As described above, since all of the low-rise, medium-rise, high-rise, and superhigh-rise data is retrieved for the neighboring region close to the focal point by the three-dimensional map data retrieving unit 56, the rendering objects, such as buildings, in all of the low-rise, medium-rise, high-rise, and superhigh-rise groups are rendered by the three-dimensional rendering data reading unit 28.

Since only the superhigh-rise data, among the low-rise, medium-rise, high-rise, and superhigh-rise data, is retrieved for the remote region far from the focal point by the three-dimensional map data retrieving unit 56, only the rendering objects, such as buildings, in the superhigh-rise group are rendered by the three-dimensional rendering data reading unit 28.

Consequently, the three-dimensional map yielded by the rendering of the rendering objects by the three-dimensional rendering data reading unit 28 is the three-dimensional image in which the buildings in all of the low-rise, medium-rise, high-rise, and superhigh-rise groups are displayed in the neighboring region and only the buildings in the superhigh-rise group are displayed in the remote region, as shown in FIG. 12.

Figure 13:
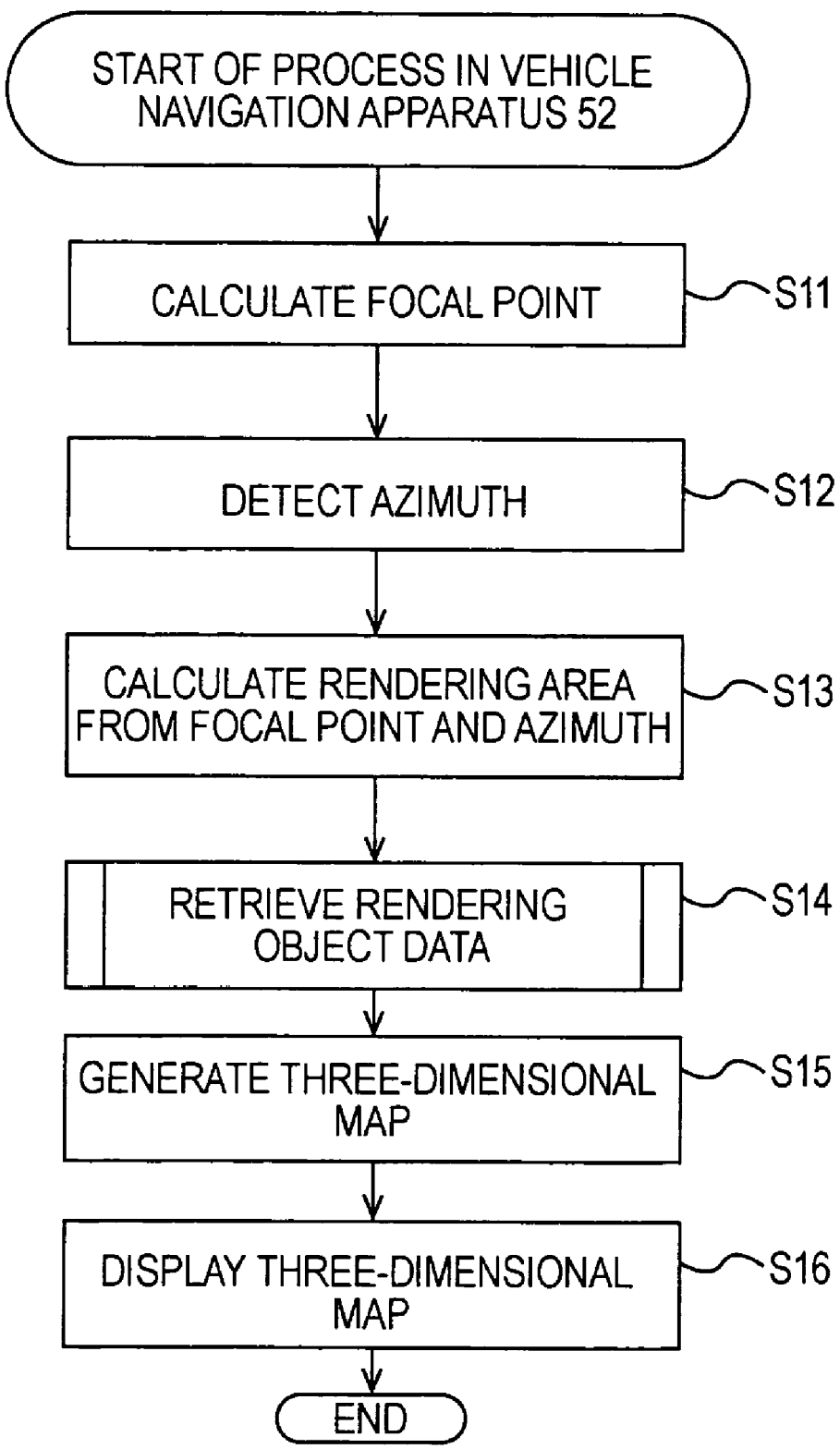
FIG. 13 is a flowchart showing an example of a process performed in the vehicle navigation apparatus in FIG. 6.

FIG. 13 is a flowchart showing an example of a process performed in the vehicle navigation apparatus 52 in FIG. 6.

The vehicle navigation apparatus 52 performs the process shown in FIG. 13, for example, periodically, when the vehicle 51 reaches an intersection, or when a user operates the operation unit (not shown).

Referring to FIG. 13, in Step S11, the focal point acquiring unit 22 receives a signal wave transmitted from the GPS satellite 11, calculates the current position of the vehicle 51 as the focal point by a predetermined calculation method, and supplies the calculated focal point to the rendering area calculating unit 24.

In Step S12, the azimuth acquiring unit 23 detects (calculates) an azimuth of the vehicle 51 and supplies the detected azimuth to the rendering area calculating unit 24.

In Step S13, the rendering area calculating unit 24 calculates a rendering area on the basis of the focal point supplied form the focal point acquiring unit 22 and the azimuth supplied from the azimuth acquiring unit 23 and supplies the calculated rendering area to the three-dimensional map data retrieving unit 56.

In Step S14, the three-dimensional map data retrieving unit 56 identifies the three-dimensional map data in the unit areas included in the rendering area supplied from the rendering area calculating unit 24 as retrieval object data. In addition, the three-dimensional map data retrieving unit 56 selects a group for each unit area included in the rendering area on the basis of the distance from the focal point to the unit area, retrieves the rendering object data in the selected group from (a file of) the three-dimensional map data identified as the retrieval object data, and supplies the retrieved rendering object data to the three-dimensional rendering data reading unit 28.

In Step S15, the three-dimensional rendering data reading unit 28 reads the three-dimensional rendering data necessary for generating the three-dimensional map from the three-dimensional rendering data DB 27 on the basis of the rendering object data supplied from the three-dimensional map data retrieving unit 56. In addition, the three-dimensional rendering data reading unit 28 performs rendering on the basis of the read three-dimensional rendering data to generate a three-dimensional map, which a three-dimensional image with respect to the focal point acquired by the focal point acquiring unit 22 toward the azimuth acquired by the azimuth acquiring unit 23, and supplies the generated three-dimensional map to the display unit 29.

In Step S16, the display unit 29 displays the three-dimensional map supplied from the three-dimensional rendering data reading unit 28 and terminates the process.

Figure 14:
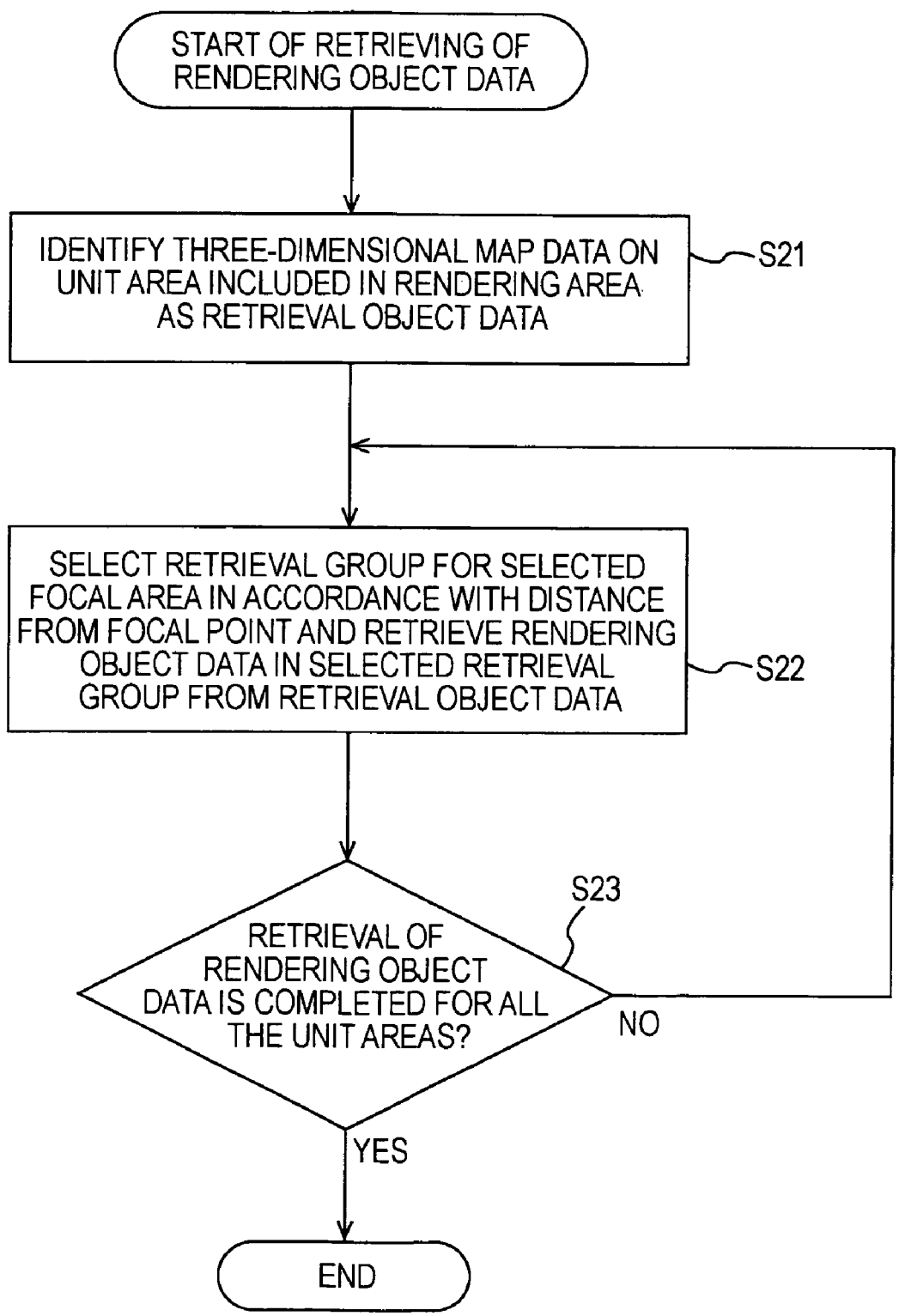
FIG. 14 is a flowchart showing in detail a step of retrieving the rendering object data in FIG. 13.

FIG. 14 is a flowchart showing in detail Step S14 in FIG. 13 (retrieving of the rendering object data) according to an embodiment of the present invention.

In Step S21, the three-dimensional map data retrieving unit 56 identifies the three-dimensional map data in the unit areas included in the rendering area supplied from the rendering area calculating unit 24, among the three-dimensional map data recorded in the three-dimensional map data DB 55, as the retrieval object data.

In Step S22, the three-dimensional map data retrieving unit 56 selects a group for each unit area included in the rendering area, supplied from the rendering area calculating unit 24, on the basis of the distance from the focal point to the unit area and retrieves the rendering object data in the selected group from the retrieval object data corresponding to the unit area. Specifically, in Step S22, the three-dimensional map data retrieving unit 56 selects, as a focal area, a unit area closest to the focal point from the unit areas that have not been selected as the focal areas, among the unit areas included in the rendering area supplied from the rendering area calculating unit 24. Accordingly, the unit areas included in the rendering area are sequentially selected as the focal areas in the ascending order of the distance from the focal point to the unit areas in the three-dimensional map data retrieving unit 56.

In addition, the three-dimensional map data retrieving unit 56 selects a retrieval group for the focal area, from which group the rendering object data is retrieved, from the four groups including the low-rise, medium-rise, high-rise, and superhigh-rise groups on the basis of the distance from the focal point to the focal area.

Specifically, for example, the three-dimensional map data retrieving unit 56 divides the rendering area into four regions: a first region closest to the focal point, a second region second closest to the focal point, a third region third closest to the focal point, and a fourth region farthest from the focal point. The unit area is set to the minimum division unit.

The three-dimensional map data retrieving unit 56 selects all the four groups including the low-rise, medium-rise, high-rise, and superhigh-rise groups as the retrieval groups when the focal area belongs to the first region. The three-dimensional map data retrieving unit 56 selects the three groups including the medium-rise, high-rise, and superhigh-rise groups as the retrieval groups when the focal area belongs to the second region. The three-dimensional map data retrieving unit 56 selects the two groups including the high-rise and superhigh-rise groups as the retrieval groups when the focal area belongs to the third region. The three-dimensional map data retrieving unit 56 selects only the superhigh-rise group as the retrieval group when the focal area belongs to the fourth area.

Furthermore, the three-dimensional map data retrieving unit 56 retrieves the rendering object data in the retrieval group from the retrieval object data.

Accordingly, the rendering object data in all the four groups including the low-rise, medium-rise, high-rise, and superhigh-rise groups is retrieved for the unit area belonging to the first region closest to the focal point. The rendering object data in the medium-rise, high-rise, and superhigh-rise groups is retrieved for the unit area belonging to the second region second closest to the focal point. The rendering object data in the high-rise and superhigh-rise groups is retrieved for the unit area belonging to the third region third closest to the focal point. The rendering object data in only the superhigh-rise group is retrieved for the unit area belonging to the fourth area farthest from the focal point.

After retrieving the rendering object data in the retrieval group for the focal area in Step S22, the three-dimensional map data retrieving unit 56 proceeds to Step S23.

In Step S23, the three-dimensional map data retrieving unit 56 determines whether the retrieval of the rendering object data is completed for all the unit areas, which are the focal areas, included in the rendering area supplied from the rendering area calculating unit 24. If the three-dimensional map data retrieving unit 56 determines that there are unit areas that have not been selected as the focal areas, the three-dimensional map data retrieving unit 56 goes back to Step S22 and repeats the above steps. If the three-dimensional map data retrieving unit 56 determines in Step S23 that all the unit areas included in the rendering area supplied from the rendering area calculating unit 24 are selected as the focal areas, the three-dimensional map data retrieving unit 56 supplies the rendering object data in which the retrieval of all the unit areas in the rendering area supplied from the rendering area calculating unit 24 is completed to the three-dimensional rendering data reading unit 28 and terminates the process.

As described above, since the three-dimensional map data retrieving unit 56 retrieves only higher-rise groups with the increasing distance from the focal point for the unit areas included in the rendering area, it is possible to suppress an increase in the number of the rendering objects, such as buildings, rendered by the three-dimensional rendering data reading unit 28 and, therefore, to rapidly (in a short time period) generate the three-dimensional map. The rendering objects in the higher-rise groups, that is, the rendering objects that are visible are rendered in the three-dimensional rendering data reading unit 28 even if the rendering objects are far from the focal point, so that the three-dimensional map with higher reality is generated.

Figure 15:
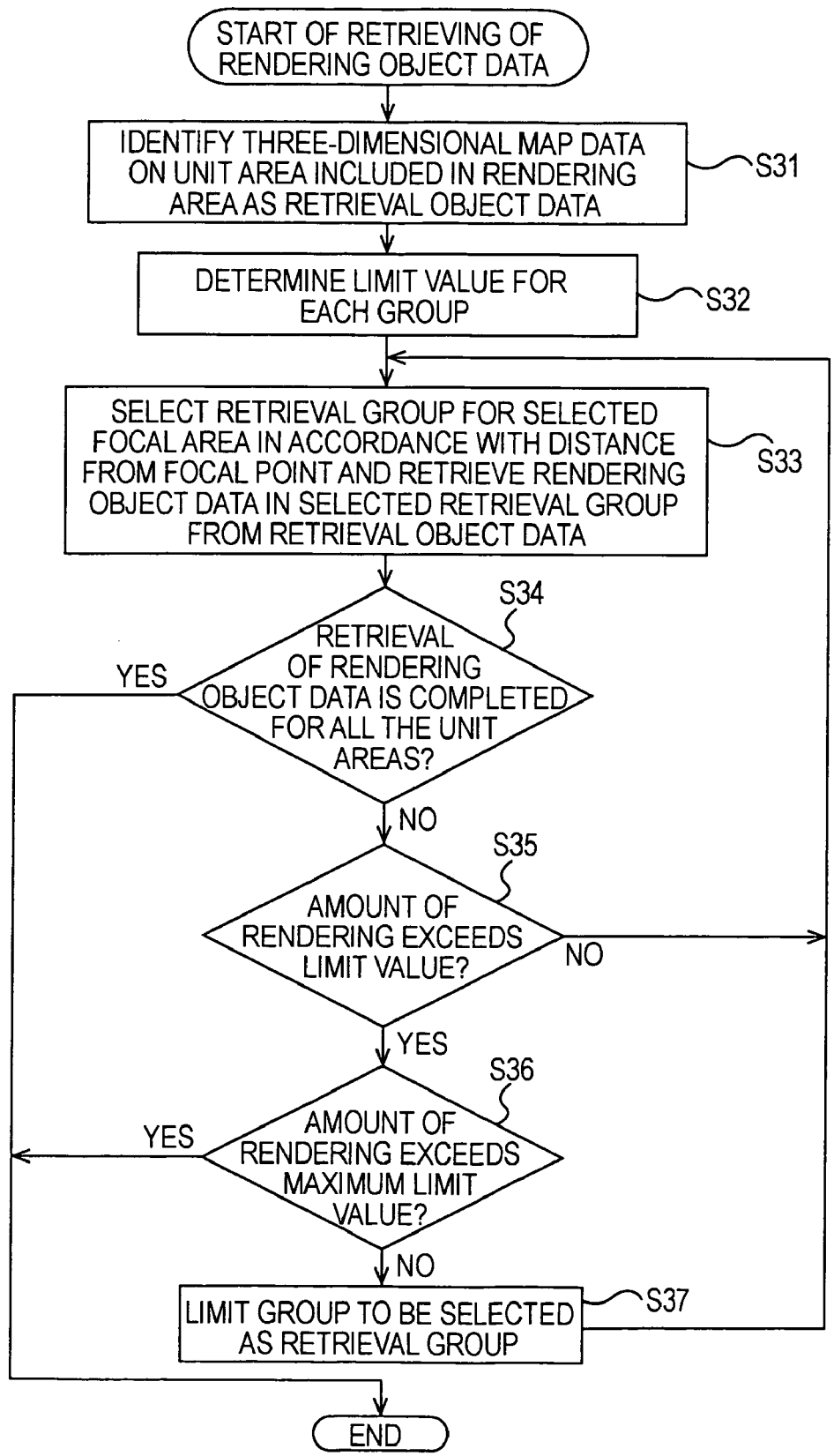
FIG. 15 is another flowchart showing the step of retrieving the rendering object data in FIG. 13.

FIG. 15 is another flowchart showing Step S14 in FIG. 13 (retrieving of the rendering object data) according to another embodiment of the present invention.

In Step S31, the three-dimensional map data retrieving unit 56 identifies the three-dimensional map data in the unit areas included in the rendering area supplied from the rendering area calculating unit 24, among the three-dimensional map data recorded in the three-dimensional map data DB 55, as the retrieval object data, as in Step S21 in FIG. 14.

In Step S32, the three-dimensional map data retrieving unit 56 determines limit values, which is thresholds used for limiting the amount of processing necessary for rendering the rendering objects, for the multiple groups for the rendering object data, that is, for the respective four groups including the low-rise, medium-rise, high-rise, and the superhigh-rise groups according to this embodiment of the present invention.

The limit values set for the low-rise, medium-rise, high-rise, and the superhigh-rise groups are increased in this order thereof.

In Step S33, the three-dimensional map data retrieving unit 56 selects, as the focal area, a unit area closest to the focal point from the unit areas that have not been selected as the focal areas, among the unit areas included in the rendering area supplied from the rendering area calculating unit 24, as in Step S22 in FIG. 14. Accordingly, the unit areas included in the rendering area are sequentially selected as the focal areas in the ascending order of the distance from the focal point to the unit areas in the three-dimensional map data retrieving unit 56.

In addition, in Step S33, the three-dimensional map data retrieving unit 56 selects a retrieval group for the focal area from the four groups including the low-rise, medium-rise, high-rise, and superhigh-rise groups on the basis of the distance from the focal point to the focal area and retrieves the rendering object data in the retrieval group from the retrieval object data, as in Step S22 in FIG. 14.

In Step S34, the three-dimensional map data retrieving unit 56 determines whether the retrieval of the rendering object data is completed for all the unit areas, which are the focal areas, included in the rendering area supplied from the rendering area calculating unit 24, as in Step S23 in FIG. 14. If the three-dimensional map data retrieving unit 56 determines that there are unit areas that have not been selected as the focal areas, the three-dimensional map data retrieving unit 56 proceeds to Step S35. If the three-dimensional map data retrieving unit 56 determines in Step S34 that all the unit areas included in the rendering area supplied from the rendering area calculating unit 24 are selected as the focal areas, the three-dimensional map data retrieving unit 56 supplies the rendering object data in which the retrieval of all the unit areas in the rendering area supplied from the rendering area calculating unit 24 is completed to the three-dimensional rendering data reading unit 28 and terminates the process.

In Step S35, the three-dimensional map data retrieving unit 56 calculates an amount of processing (hereinafter appropriately referred to as an amount of rendering) necessary for performing the rendering on the basis of the rendering object data that has been retrieved in Step S33, and determines whether the amount of rendering exceeds any of the limit values for the low-rise, medium-rise, high-rise, and superhigh-rise groups.

The rendering object data includes information concerning, for example, a polygon or texture necessary for rendering the rendering objects corresponding to the rendering object data. The three-dimensional map data retrieving unit 56 calculates the amount of rendering on the basis of this information.

A table may be prepared in which the information concerning, for example, a polygon necessary for rendering the rendering objects is associated with the amount of rendering necessary for rendering the rendering objects. In this case, the three-dimensional map data retrieving unit 56 uses the table to calculate the amount of rendering.

If the three-dimensional map data retrieving unit 56 determines in Step S35 that the amount of rendering does not exceed any of the limit values for the low-rise, medium-rise, high-rise, and superhigh-rise groups, the three-dimensional map data retrieving unit 56 goes back to Step S33 and repeats the above steps.

If the three-dimensional map data retrieving unit 56 determines in Step S35 that the amount of rendering exceeds any of the limit values for the low-rise, medium-rise, high-rise, and superhigh-rise groups, the three-dimensional map data retrieving unit 56 proceeds to Step S36 and determines whether the amount of rendering exceeds the limit value for the superhigh-rise group, that is the maximum limit value among the limit values for the low-rise, medium-rise, high-rise, and superhigh-rise groups.

If the three-dimensional map data retrieving unit 56 determines in Step S36 that the amount of rendering exceeds the limit value for the superhigh-rise group, the three-dimensional map data retrieving unit 56 supplies the rendering object data that has been retrieved to the three-dimensional rendering data reading unit 28 and terminates the process.

If the three-dimensional map data retrieving unit 56 determines in Step S36 that the amount of rendering does not exceed the limit value for the superhigh-rise group, the three-dimensional map data retrieving unit 56 proceeds to Step S37 and limits the groups to be selected as the retrieval groups.

Specifically, if the amount of rendering exceeds only the limit value for the low-rise group, the three-dimensional map data retrieving unit 56 limits the groups to be selected as the retrieval groups to the three groups including the medium-rise, high-rise, and superhigh-rise groups. If the amount of rendering exceeds the limit value for the medium-rise group (also exceeds the limit value for the low-rise group), the three-dimensional map data retrieving unit 56 limits the groups to be selected as the retrieval groups to the two groups including the high-rise and superhigh-rise groups. If the amount of rendering exceeds the limit value for the high-rise group (also exceeds the limit values for the low-rise and medium-rise groups), the three-dimensional map data retrieving unit 56 limits the group to be selected as the retrieval group only to the superhigh-rise group.

After the groups to be selected as the retrieval groups are limited in Step S37, the three-dimensional map data retrieving unit 56 selects the groups in accordance with the limitation in Step S33.

For example, if the groups to be selected as the retrieval groups are limited to the medium-rise, high-rise, and superhigh-rise groups even when the focal area belongs to the first region, the medium-rise, high-rise, and superhigh-rise groups are selected as the retrieval groups but the low-rise group is not selected as the retrieval group.

After limiting the groups to be selected as the retrieval groups in the manner described above in Step S37, the three-dimensional map data retrieving unit 56 goes back to Step S33 and repeats the above steps.

As described above, when the retrieval groups for the focal area are selected on the basis of the distance from the focal point to the focal area and the groups to be selected as the retrieval groups are limited in accordance with the amount of processing (the amount of rendering) necessary for performing the rendering on the basis of the rendering object data retrieved by the three-dimensional map data retrieving unit 56, it is possible to display the three-dimensional map with reality while limiting the time necessary for the rendering in the three-dimensional rendering data reading unit 28 to a certain short time period because the amount of processing necessary for performing the rendering on the basis of the rendering object data retrieved by the three-dimensional map data retrieving unit 56 is limited.

Although, in the process shown in FIG. 15, the three-dimensional map data retrieving unit 56 selects the retrieval groups for the focal area in accordance with the distance from the focal point to the focal area and limits the groups to be selected as the retrieval groups on the basis of the amount of processing (the amount of rendering) necessary for performing the rendering on the basis of the rendering object data that has been retrieved, the groups may be selected regardless of the distance from the focal point. In this case, specifically, the three-dimensional map data retrieving unit 56 basically selects all the groups as the retrieval groups and, if the groups to be selected as the retrieval groups are limited on the basis of the amount of rendering, the three-dimensional map data retrieving unit 56 selects all the groups other than the limited groups as the retrieval groups.

If a dense region having multiple rendering objects is selected as the rendering area in the above case, the rendering object data concerning the rendering objects in all the groups is retrieved at positions up to a certain distance from the focal point but only the rendering object data concerning the rendering objects in the higher-rise groups is retrieved at positions far from the above positions. In contrast, if a sparse region having a few rendering objects is selected as the rendering area, the rendering object data concerning the rendering objects in all the groups is retrieved at positions rather far from the focal point.

A value input by a user with the operation unit (not shown) may be determined to be the limit value in Step S32. Alternatively, a predetermined value may be recorded in the storage medium, such as the three-dimensional map data DB 55, and the value recorded in the recording medium may be determined to be the limit value in Step S32.

Figure 16:
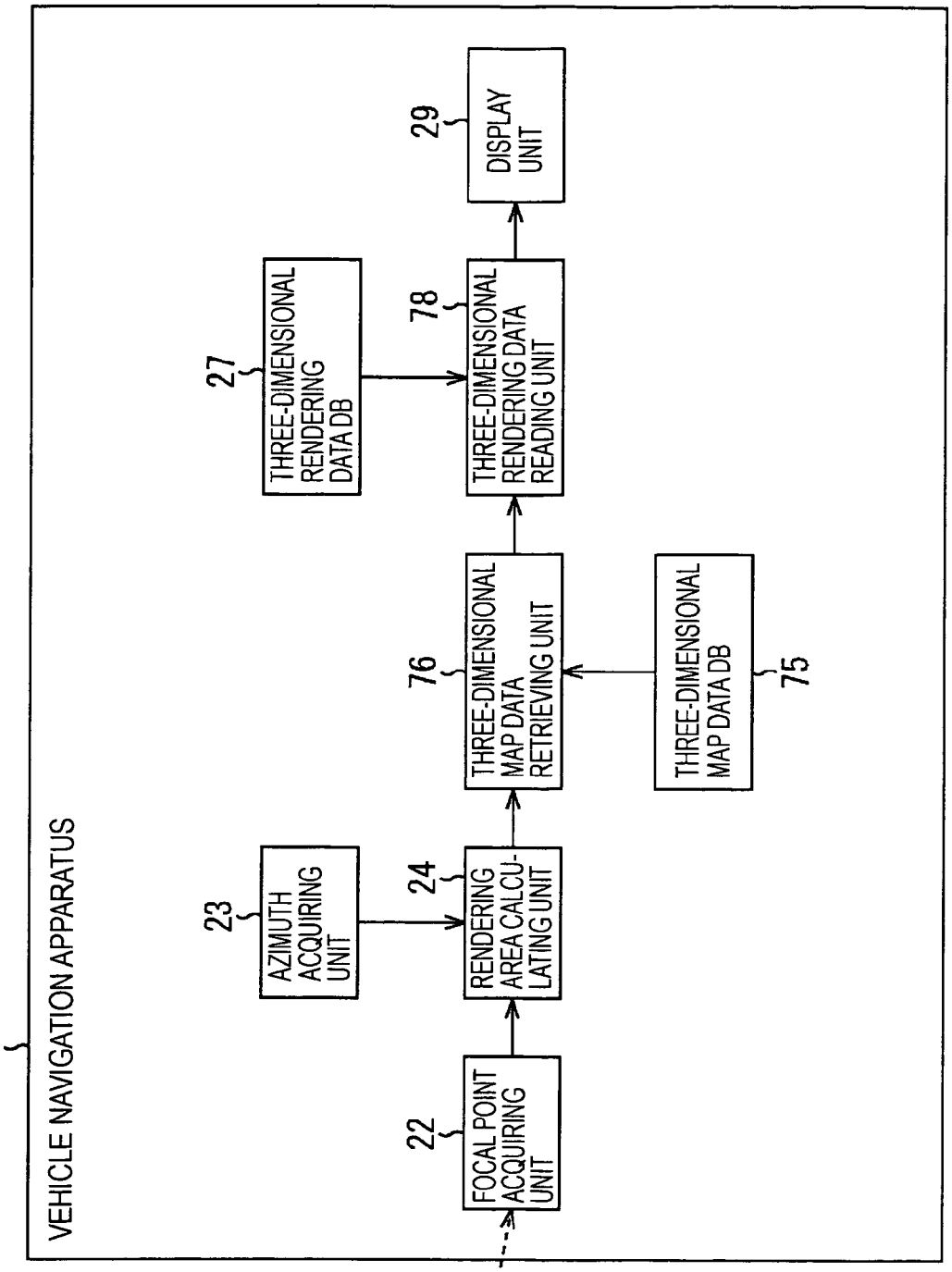
FIG. 16 is a block diagram showing a second example of the configuration of the vehicle navigation apparatus in FIG. 5.

FIG. 16 is a block diagram showing a second example of the configuration of the vehicle navigation apparatus 52 in FIG. 5.

The same reference numerals are used in FIG. 16 to identify the same components shown in FIG. 6. A detailed description of such components is omitted herein.

The vehicle navigation apparatus 52 in FIG. 16 has a configuration similar to that of the vehicle navigation apparatus 52 in FIG. 6, except that the vehicle navigation apparatus 52 includes a three-dimensional map data DB 75, a three-dimensional map data retrieving unit 76, and a three-dimensional rendering data reading unit 78 instead of the three-dimensional map data DB 55, the three-dimensional map data retrieving unit 56, and the three-dimensional rendering data reading unit 28, respectively, in FIG. 6.

The three-dimensional map data DB 75 has three-dimensional map data recorded therein. The three-dimensional map data recorded in the three-dimensional map data DB 75 is divided into pieces of data in rectangular unit areas and the pieces of data in the unit areas are stored in files, like the three-dimensional map data recorded in the three-dimensional map data DB 55 in FIG. 6. The three-dimensional map data includes rendering object data concerning the rendering objects, such as buildings, located within each unit area.

The rendering object data included in the three-dimensional map data for every unit area recorded in the three-dimensional map data DB 75 is hierarchized into multiple groups, like the rendering object data recorded in the three-dimensional map data DB 55 in FIG. 6. In addition, the three-dimensional map data recorded in the three-dimensional map data DB 75 includes image data (hereinafter appropriately referred to as superhigh-rise image data) yielded when the rendering objects in the superhigh-rise group are viewed from multiple directions, such as eight or sixteen directions.

The three-dimensional map data retrieving unit 76 selects a group, retrieves the rendering object data in the selected group from the three-dimensional map data DB 75, and supplies the retrieved rendering object data to the three-dimensional rendering data reading unit 78, like the three-dimensional map data retrieving unit 56 in FIG. 6. If the three-dimensional map data retrieving unit 76 selects the superhigh-rise group for unit areas far from the focal point, the three-dimensional map data retrieving unit 76 also retrieves image data (superhigh-rise image data) concerning the rendering objects in the superhigh-rise group, in addition to the rendering object data (the superhigh-rise data) concerning the rendering objects in the superhigh-rise group, from the three-dimensional map data DB 75 and supplies the retrieved rendering object data and superhigh-rise image data to the three-dimensional rendering data reading unit 78.

For example, the three-dimensional map data retrieving unit 76 selects only the superhigh-rise group as the retrieval group for the unit areas far from the focal point (for example, the unit areas belonging to the above fourth area). In this case, the three-dimensional map data retrieving unit 76 retrieves the superhigh-rise image data concerning the closest image yielded when the rendering objects are viewed from the focal point, in addition to the rendering object data concerning the rendering objects in the superhigh-rise group, and supplies the retrieved rendering object data and superhigh-rise image data to the three-dimensional rendering data reading unit 78.

The three-dimensional rendering data reading unit 78 performs the rendering on the basis of the rendering object data supplied from the three-dimensional map data retrieving unit 76, like the three-dimensional rendering data reading unit 28 in FIG. 6, to generate a three-dimensional map. However, the three-dimensional rendering data reading unit 78 does not perform the rendering on the basis of the rendering object data for the rendering objects in the superhigh-rise group in a remote region in the rendering area. The three-dimensional rendering data reading unit 78 directly uses the superhigh-rise image data supplied from the three-dimensional map data retrieving unit 76 to generate a three-dimensional map and supplies the generated three-dimensional map to the display unit 29.

Figure 17:
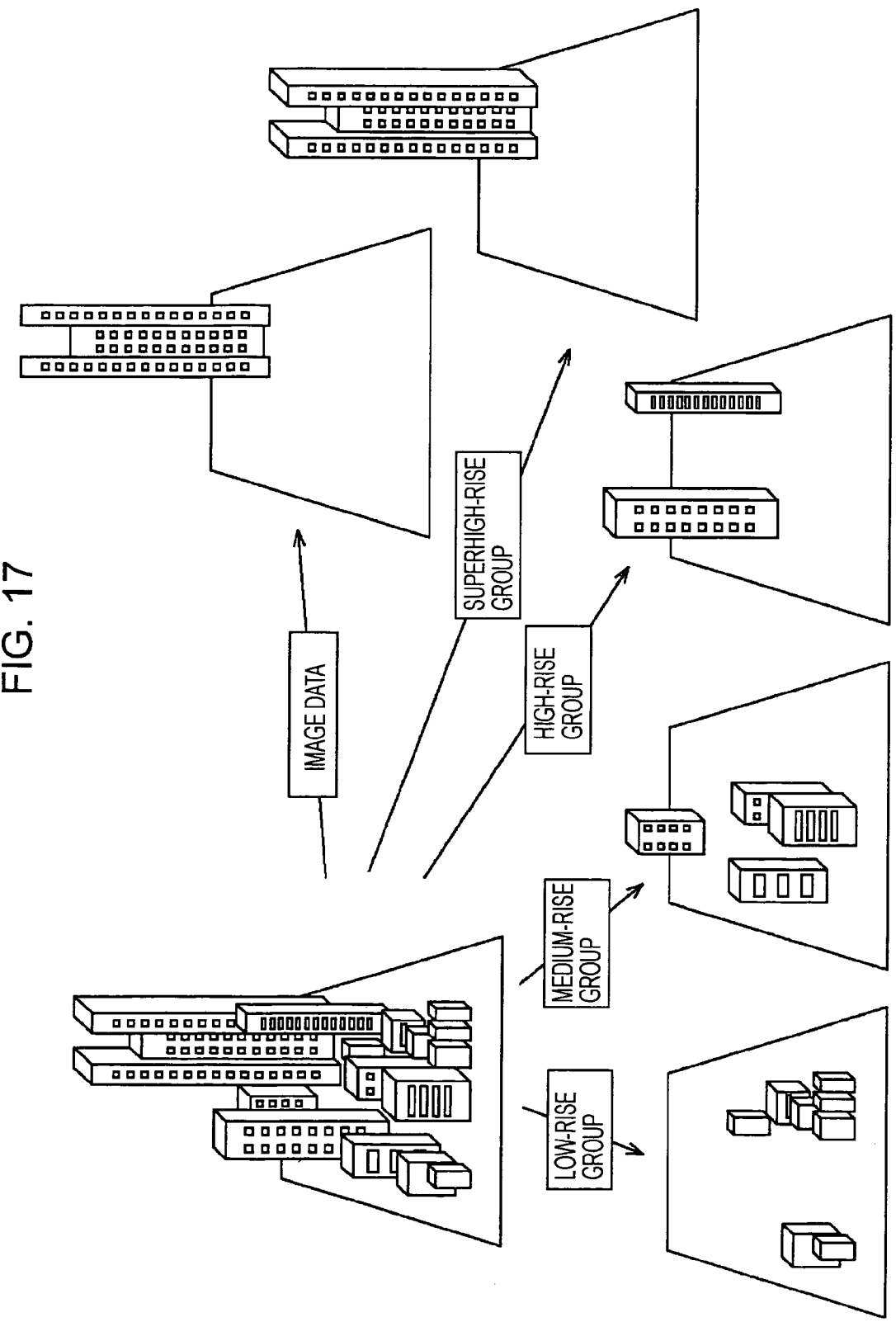
FIG. 17 schematically shows the three-dimensional map data in unit areas, recorded in a three-dimensional map data DB in FIG. 16.

FIG. 17 schematically shows the three-dimensional map data in unit areas, recorded in the three-dimensional map data DB 75 in FIG. 16.

The rendering object data included in the three-dimensional map data in each unit area, recorded in the three-dimensional map data DB 75, that is, the rendering object data concerning the rendering objects located in each unit area is hierarchized into the four groups including the low-rise, medium-rise, high-rise, and superhigh-rise groups in accordance with the characteristics of the rendering objects, such as the heights of the buildings being the rendering objects, the altitudes of the positions where the rendering objects are located, and the identification level of the rendering objects, that is, in accordance with how visible the rendering objects are when they are viewed from far away, as in the example shown in FIG. 8. In addition, the three-dimensional map data in each unit area, recorded in the three-dimensional map data DB 75, includes image data (superhigh-rise image data) yielded, for example, when the rendering objects in the superhigh-rise group are viewed from multiple directions.

The superhigh-rise image data is generated by rendering in advance the rendering objects in the superhigh-rise group from multiple viewpoints.

FIG. 18 is a table showing an example of the content of data stored (recorded) in the three-dimensional map data DB 75 in FIG. 16.

The three-dimensional map data DB 75 includes the low-rise data, the medium-rise data, the high-rise data, and the superhigh-rise data for every unit area $r_1, r_2, \ldots$, as shown in FIG. 18.

The three-dimensional rendering data reading unit 78 in the vehicle navigation apparatus 52 shown in FIG. 16 does not perform the rendering on the basis of the rendering object data but uses the superhigh-rise image data supplied from the three-dimensional map data retrieving unit 76, for the rendering objects in the superhigh-rise group in the unit areas far from the focal point, to generate a three-dimensional map. Accordingly, the three-dimensional map can be rapidly generated, compared with the case in which the rendering objects in the superhigh-rise group are rendered on the basis of the rendering object data.

The superhigh-rise image data concerns rendering objects far from the focal point, although the superhigh-rise image data is not necessarily accurate image data concerning the rendering objects in the superhigh-rise group with respect to the focal point. Accordingly, since the superhigh-rise image data is displayed in small size in the three-dimensional map because of the law of perspective, the reality of the three-dimensional map is (hardly) lost.

FIG. 19 is a block diagram showing an example of the configuration of a personal computer performing the series of processing described above by the use of programs. A central processing unit (CPU) 201 performs a variety of processing in accordance with programs stored in a read only memory (ROM) 202 or a storage unit 208. A random access memory (RAM) 203 includes programs and data executed by the CPU 201. The CPU 201, the ROM 202, and the RAM 203 are connected to each other via a bus 204.

An input-output interface 205 is connected to the CPU 201 via the bus 204. An input unit 206 including a keyboard, a mouse, a microphone, and so on and an output unit 207 including a display device, a speaker, and so on are connected to the input-output interface 205. The CPU 201 performs the variety of processing in response to instructions input with the input unit 206 and supplies the result of the processing to the output unit 207.

The storage unit 208 connected to the input-output interface 205 is, for example, a hard disk and stores programs and data executed by the CPU 201. A communication unit 209 communicates with external devices via a network, such as the Internet or a local area network.

Programs may be acquired through the communication unit 209 and the acquired programs may be stored in the storage unit 208.

A drive 210 connected to the input-output interface 205 drives a removable medium 211, such as a magnetic disk, an optical disc, a magneto-optical disk, or a semiconductor memory, and acquires programs and data recorded in the removable medium 211 when the removable medium 211 is loaded in the drive 210. The acquired programs and data are transferred to and stored in the storage unit 208, if necessary.

The series of processing described above may be performed by hardware or software. When the series of processing is performed by software, the programs in the software are installed from a program recording medium in a computer included in dedicated hardware or in a general-purpose personal computer capable of installing various programs to perform various functions.

Program recording media storing programs that are installed in and executed by a computer include, as shown in FIG. 19, a removable medium 211, which is a package medium, such as a magnetic disk (including a flexible disk), an optical disc (a compact disk-read only memory (CD-ROM) or a digital versatile disk (DVD)), a magneto-optical disk, or a semiconductor memory; the ROM 202 in which the programs are temporarily or permanently stored; and a hard disk serving as the storage unit 208. The programs are stored in the program recording medium through the communication unit 209, which is an interface, such as a router or a modem, over a wired or wireless communication medium, such as a local are network, the Internet, or a digital satellite, if necessary.

In this specification, the steps describing the programs stored in the program recording medium may be performed in time series in the order in which the steps are described or may be performed individually or in parallel.

In this specification, the system means the entire system including multiple apparatuses.

It will be further understood by those skilled in the art that the foregoing description is of the preferred embodiments of the present invention and that various changes and modifications may be made to the invention without departing from the spirit and scope thereof.

Although the present invention is applied to the vehicle navigation system in the above embodiments, the present invention is applicable to, for example, a mobile phone having a GPS function and capable of displaying a map or a Web server providing map information, in addition to the vehicle navigation system. The present invention is also applicable to display of a two-dimensional map, in addition to the display of a three-dimensional map.

In the above embodiments of the present invention, the three-dimensional map data recorded in the three-dimensional map data DB 55 in FIG. 6 and three-dimensional map data DB 75 in FIG. 16 is divided into pieces of data in rectangular unit areas and the pieces of data in the unit areas are stored in files. The rectangular areas are given by segmenting the map in the latitude and longitude directions into an array. However, the three-dimensional map data may not be necessarily divided into areas, such as the unit areas.

Although the rendering object data is hierarchized into the four groups including the low-rise, medium-rise, high-rise, and superhigh-rise groups in the above embodiments of the present invention, the rendering object data may be divided into two or three groups or may be divided into five or more groups.

Although the image data concerning the rendering objects (the superhigh-rise image data) is provided only for the superhigh-rise group in the embodiments of the present invention, the image data concerning the rendering objects may also be provided for the high-rise group and the image data concerning the rendering objects in the high-rise group may be used to generate a three-dimensional map.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus generating a three-dimensional map, which is a three-dimensional image, on the basis of three-dimensional map data concerning the three-dimensional map, the information processing apparatus comprising:

rendering area acquiring means for acquiring a rendering area, which is a geographical range in which the three-dimensional map is generated with respect to a focal point;

identifying means for identifying the three-dimensional map data in the rendering area, among the three-dimensional map data including rendering object data that concerns a plurality of rendering objects rendered in order to generate the three-dimensional map and that is hierarchized into multiple groups in accordance with characteristics of the plurality of rendering objects with at least a first hierarchical group having a first set of characteristics of at least one rendering object and a second hierarchical group having a second set of characteristics of at least a different rendering object being less than the first set of characteristics of the at least one rendering object;

rendering object data acquiring means for selecting a group on the basis of a distance from the focal point and acquiring the rendering object data in the selected group from the three-dimensional map data in the rendering area; and three-dimensional map generating means for rendering the rendering objects on the basis of the rendering object data acquired from the three-dimensional map data in the rendering area to generate the three-dimensional map.

2. The information processing apparatus according to claim 1, wherein the rendering object data is hierarchized on the basis of respective heights of the rendering objects, and wherein the rendering object data acquiring means selects all the groups when the distance from the focal point is short and selects only higher-rise groups with the increasing distance from the focal point.

3. The information processing apparatus according to claim 1, wherein the three-dimensional map generating means, for a specific rendering object corresponding to the rendering object data in a specific group, uses image data yielded by rendering in advance the specific rendering object to generate the three-dimensional map.

4. The information processing apparatus according to claim 1, wherein the rendering object data acquiring means acquires the rendering object data concerning the rendering object close to the focal point, and limits the groups to be selected if an amount of processing necessary for the rendering on the basis of the acquired rendering object data exceeds a predetermined limit value.

5. The information processing apparatus according to claim 1, wherein the rendering object data is hierarchized on the basis of respective heights of the plurality of rendering objects, the altitude of respective positions where the plurality of rendering object is located, or respective identification levels of the plurality of rendering objects.

6. The information processing apparatus according to claim 1, wherein the plurality of rendering objects is representative images of building structures and the characteristics of the building structures are heights of the building structures, altitudes of respective positions where the building structures are located and identification levels of the building structures.

7. A computer-implemented information processing method for generating a three-dimensional map on a computer display, which is a three-dimensional image, on the basis of three-dimensional map data concerning the three-dimensional map, the computer-implemented information processing method comprising the steps of:

acquiring a rendering area, which is a geographical range in which the three-dimensional map is generated with respect to a focal point;

identifying the three-dimensional map data in the rendering area, among the three-dimensional map data including rendering object data that concerns at least one rendering object rendered in order to generate the three-dimensional map and that is hierarchized into multiple groups in accordance with characteristics of the rendering objects with at least a first hierarchical group having a first set of characteristics of at least one rendering object and a second hierarchical group having a second set of characteristics of at least a different rendering object being less than the first set of characteristics of the at least one rendering object;

selecting a group on the basis of the distance from the focal point and acquiring the rendering object data in the selected group from the three-dimensional map data in the rendering area; and rendering the plurality of rendering objects on the basis of the rendering object data acquired from the three-dimensional map data in the rendering area to generate the three-dimensional map.

8. The computer-implemented information processing method information according to claim 7, wherein the plurality of rendering objects is representative images of building structures and the characteristics of the building structures are heights of the building structures, altitudes of respective positions where the building structures are located and identification levels of the building structures.

9. A computer readable medium tangibly embodying computer-executable instructions that when executed by a computer performs steps and causing a computer to perform information processing for generating a three-dimensional map, which is a three-dimensional image, on the basis of three-dimensional map data concerning the three-dimensional map, comprising the computer-performed steps of:

acquiring a rendering area, which is a geographical range in which the three-dimensional map is generated with respect to a focal point;

identifying the three-dimensional map data in the rendering area, among the three-dimensional map data including rendering object data that concerns a plurality of rendering objects rendered in order to generate the three-dimensional map and that is hierarchized into multiple groups in accordance with characteristics of the plurality of rendering objects with at least a first hierarchical group having a first set of characteristics of at least one rendering object and a second hierarchical group having a second set of characteristics of at least a different rendering object being less than the first set of characteristics of the at least one rendering object;

selecting a group on the basis of the distance from the focal point and acquiring the rendering object data in the selected group from the three-dimensional map data in the rendering area; and rendering the plurality of rendering objects on the basis of the rendering object data acquired from the three-dimensional map data in the rendering area to generate the three-dimensional map.

10. The computer readable medium according to claim 9, wherein the plurality of rendering objects is representative images of building structures and the characteristics of the building structures are heights of the building structures, altitudes of respective positions where the building structures are located and identification levels of the building structures.

11. An information processing apparatus generating a three-dimensional map, which is a three-dimensional image, on the basis of three-dimensional map data concerning the three-dimensional map, the information processing apparatus comprising:

a rendering area acquiring unit that acquires a rendering area, which is a geographical range in which the three-dimensional map is generated with respect to a focal point;

an identifying unit that identifies the three-dimensional map data in the rendering area, among the three-dimensional map data including rendering object data that concerns a plurality of rendering objects rendered in order to generate the three-dimensional map and that is hierarchized into multiple groups in accordance with characteristics of the plurality of rendering objects with at least a first hierarchical group having a first set of characteristics of at least one rendering object and a second hierarchical group having a second set of characteristics of at least a different rendering object being less than the first set of characteristics of the at least one rendering object;

a rendering object data acquiring unit that selects a group on the basis of the distance from the focal point and acquires the rendering object data in the selected group from the three-dimensional map data in the rendering area; and a three-dimensional map generating unit that renders the plurality of rendering objects on the basis of the rendering object data acquired from the three-dimensional map data in the rendering area to generate the three-dimensional map.

12. The information processing apparatus according to claim 11, wherein the plurality of rendering objects is representative images of building structures and the characteristics of the building structures are heights of the building structures, altitudes of respective positions where the building structures are located and identification levels of the building structures.

* * * * *